(12) United States Patent
Yoshimura

(10) Patent No.: US 10,306,043 B2
(45) Date of Patent: May 28, 2019

(54) INFORMATION PROCESSING APPARATUS AND METHOD TO CONTROL A PROCESS BASED ON CONTROL INFORMATION

(71) Applicant: SONY CORPORATION, Tokyo (JP)

(72) Inventor: Osamu Yoshimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/124,818

(22) PCT Filed: Feb. 5, 2015

(86) PCT No.: PCT/JP2015/053311
§ 371 (c)(1),
(2) Date: Sep. 9, 2016

(87) PCT Pub. No.: WO2015/141320
PCT Pub. Date: Sep. 24, 2015

(65) Prior Publication Data
US 2017/0026505 A1     Jan. 26, 2017

(30) Foreign Application Priority Data
Mar. 19, 2014   (JP) ................ 2014-056308

(51) Int. Cl.
*H04M 1/725*   (2006.01)
*H04N 21/436*  (2011.01)
*H04N 21/414*  (2011.01)

(52) U.S. Cl.
CPC ..... *H04M 1/72519* (2013.01); *H04M 1/7253* (2013.01); *H04N 21/41422* (2013.01); *H04N 21/436* (2013.01)

(58) Field of Classification Search
CPC ............ H04M 1/72519; H04M 1/1253; H04N 21/41422; H04N 21/436
(Continued)

(56) References Cited

U.S. PATENT DOCUMENTS

2012/0047234 A1* 2/2012 Terayoko .......... G06F 17/30905
709/219
2013/0002949 A1* 1/2013 Raveendran .......... H04W 28/18
348/469

(Continued)

FOREIGN PATENT DOCUMENTS

EP     2690846 A1    1/2014
JP    11-196184 A    7/1999
(Continued)

OTHER PUBLICATIONS

Wi-Fi Alliance, "Wi-Fi DisplayTechnical Specification—Version 1.0.0", Wi-Fi Alliance® Technical Committee, Wi-Fi Display Technical Task Group, Aug. 24, 2012, pp. 149, v1.0.0.

(Continued)

*Primary Examiner* — Angelica M Perez
(74) *Attorney, Agent, or Firm* — Chip Law Group

(57) ABSTRACT

An information processing apparatus includes a wireless communication unit configured to perform wireless communication with another information processing apparatus, a display unit configured to display an image received from the another information processing apparatus by the wireless communication unit, an acquisition unit configured to acquire operation to a region indicated in control information received from the another information processing apparatus by the wireless communication unit in the image displayed by the display unit, and a control unit configured to perform control to perform processing indicated in the control information according to the operation acquired by the acquisition unit.

16 Claims, 31 Drawing Sheets

(58) Field of Classification Search
USPC .................................................... 455/569.2
See application file for complete search history.

(56) References Cited

U.S. PATENT DOCUMENTS

| | | | |
|---|---|---|---|
| 2013/0080587 A1 | 3/2013 | Yajima | |
| 2013/0136089 A1* | 5/2013 | Gillett | H04W 72/048 370/329 |
| 2013/0238702 A1* | 9/2013 | Sheth | H04L 67/38 709/204 |
| 2014/0009394 A1* | 1/2014 | Lee | H04N 5/4403 345/157 |
| 2014/0282728 A1* | 9/2014 | Matsunaga | G06F 3/0488 725/38 |
| 2015/0138213 A1* | 5/2015 | Turner | G06F 3/048 345/520 |

FOREIGN PATENT DOCUMENTS

| | | |
|---|---|---|
| JP | 2003-018568 A | 1/2003 |
| JP | 2008-112425 A | 5/2008 |
| JP | 2012-043140 A | 3/2012 |
| JP | 2013-221769 A | 10/2013 |
| WO | 2013/103726 A1 | 7/2013 |
| WO | 2013/111239 A | 8/2013 |
| WO | 2013/111239 A1 | 8/2013 |

OTHER PUBLICATIONS

"Wi-Fi Display Technical Specification Version 1.0.0", Wi-Fi Alliance, 2012, pp. 1-149.

Extended European Search Report of EP Patent Application No. 15765261.1, dated Nov. 7, 2017, 10 pages.

Office Action for JP Patent Application No. 2016-508587, dated Jul. 17, 2018, 13 pages of Office Action and 05 pages of English Translation.

Office Action for JP Patent Application No. 2016-508587, dated Oct. 16, 2018, 07 pages of Office Action and 12 pages of English Translation.

* cited by examiner

FIG. 3
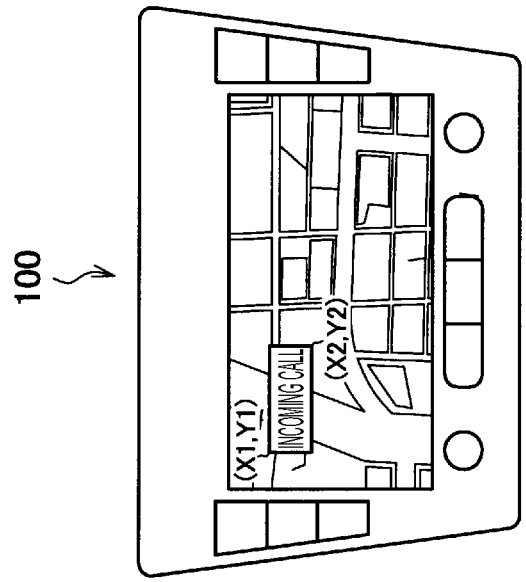
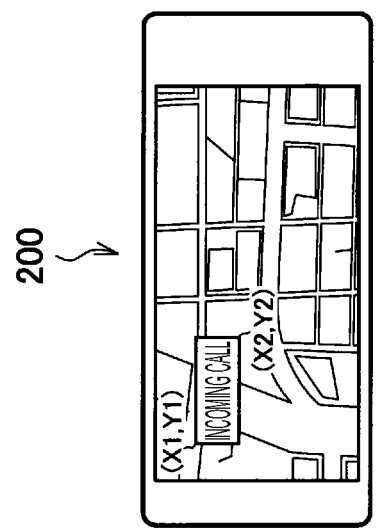

FIG. 12
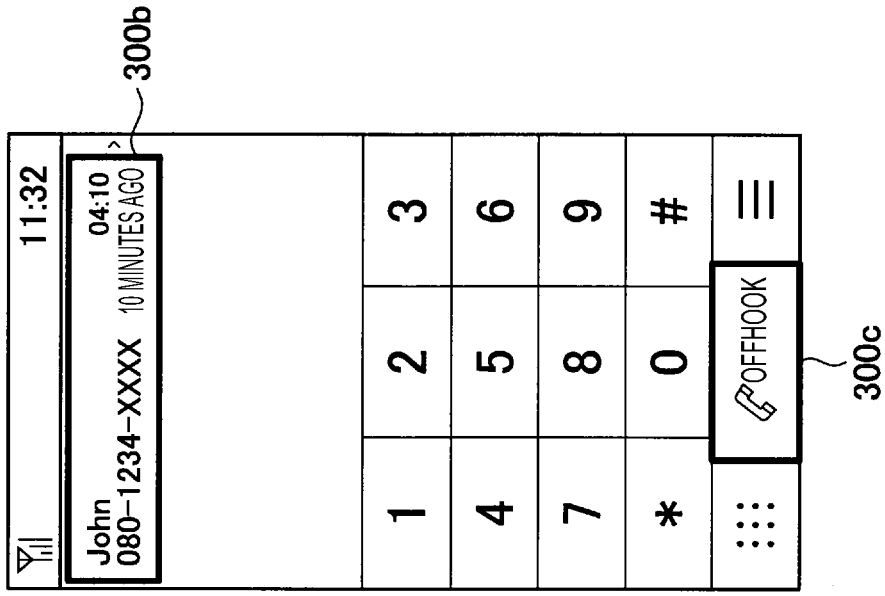
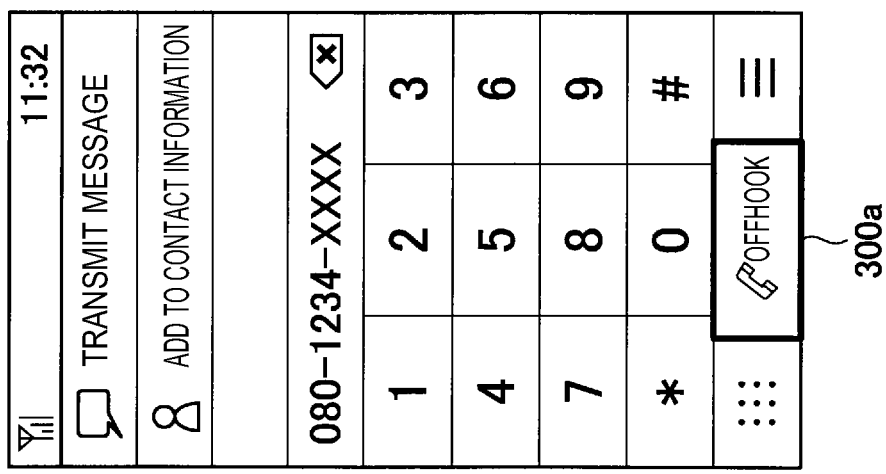

INFORMATION PROCESSING APPARATUS AND METHOD TO CONTROL A PROCESS BASED ON CONTROL INFORMATION

CROSS REFERENCE TO RELATED APPLICATIONS

This application is a U.S. National Phase of International Patent Application No. PCT/JP2015/053311 filed on Feb. 5, 2015, which claims priority benefit of Japanese Patent Application No. 2014-056308 filed in the Japan Patent Office on Mar. 19, 2014. Each of the above-referenced applications is hereby incorporated herein by reference in its entirety.

TECHNICAL FIELD

The present disclosure relates to an information processing apparatus, an information processing system and an information processing method.

BACKGROUND ART

Today, various kinds of electronic devices have capabilities of encoding and transferring multimedia content or decoding and reproducing it. Encoded content is transferred on a multimedia network, and is reproduced by a device that receives the content. Multimedia networks were formed mostly using wired communication technologies such as High-Definition Multimedia Interface (HDMI) (registered trademark) in the past. However, as a result of the rapid development of wireless communication technologies seen in recent years, wireless communication networks, for example, wireless local area networks (LANs), have been utilized for transfer of multimedia content.

A device that encodes and delivers content as necessary is generally called a source device. On the other hand, a device that receives content from a source device and reproduces it is called a sink device. There is, for example, a Wi-Fi display as a technology of displaying content delivered from a source device at a sink device.

Non-Patent Literature 1 is the Wi-Fi Display Technical Specification stipulated by the Wi-Fi Alliance. Wi-Fi Display is also called Wi-Fi CERTIFIED Miracast (registered trademark). Wi-Fi Display employs Wi-Fi Direct (registered trademark) for forming a wireless communication network between wireless LAN devices without passing through an access point as an underlying technology, and defines protocols for transferring high-definition video content from a source device to a sink device.

CITATION LIST

Non-Patent Literature

Non-Patent Literature 1: "Wi-Fi Display Technical Specification Version 1.0.0," Wi-Fi Alliance Technical Committee, Wi-Fi Display Technical Task Group, Aug. 24, 2012

SUMMARY OF INVENTION

Technical Problem

However, with the technology disclosed in the above-described Non-Patent Literature 1, a technology regarding content reproduction control is mainly defined, and how a source device and a sink device operate in coordination with each other in response to user operation is still developing. Therefore, the present disclosure proposes new and improved information processing apparatus, information processing system and information processing method which can improve a technology regarding coordination of a source device and a sink device in response to user operation.

Solution to Problem

According to the present disclosure, there is provided an information processing apparatus including: a wireless communication unit configured to perform wireless communication with another information processing apparatus; a display unit configured to display an image received from the another information processing apparatus by the wireless communication unit; an acquisition unit configured to acquire operation to a region indicated in control information received from the another information processing apparatus by the wireless communication unit in the image displayed by the display unit; and a control unit configured to perform control to perform processing indicated in the control information according to the operation acquired by the acquisition unit.

According to the present disclosure, there is provided an information processing apparatus including: a wireless communication unit configured to perform wireless communication with another information processing apparatus; and a control unit configured to transmit control information to the another information processing apparatus via the wireless communication unit, the control information being information for transmitting an image to the another information processing apparatus via the wireless communication unit and enabling the another information processing apparatus to perform corresponding processing when operation to a designated region in the displayed image is detected.

According to the present disclosure, there is provided an information processing system including: a transmission side apparatus; and a reception side apparatus. The transmission side apparatus includes a first wireless communication unit configured to perform wireless communication with the reception side apparatus, and a first control unit configured to transmit control information to the reception side apparatus via the first wireless communication unit, the control information being information for transmitting an image to the reception side apparatus via the first wireless communication unit and enabling the reception side apparatus to perform corresponding processing when operation to a designated region in the displayed image is detected. The reception side apparatus includes a second wireless communication unit configured to perform wireless communication with the transmission side apparatus, a display unit configured to display the image received from the transmission side apparatus by the second wireless communication unit, an acquisition unit configured to acquire operation to a region indicated in the control information received from the transmission side apparatus by the second wireless communication unit in the image displayed by the display unit, and a control unit configured to perform control to perform processing indicated in the control information according to the operation acquired by the acquisition unit.

According to the present disclosure, there is provided an information processing method executed by a processor, the information processing method including: performing wireless communication with another information processing apparatus; displaying an image received from the another information processing apparatus; acquiring operation to a region indicated in control information received from the another information processing apparatus in the displayed image; and controlling an information processing apparatus to perform processing indicated in the control information according to the acquired operation.

Advantageous Effects of Invention

According to the technology according to the present disclosure, a sink device can directly execute processing according to user operation without the need of recognition of user operation by a source device and an instruction to the sink device.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 3 is a diagram for explaining a command region and command information according to an embodiment of the present disclosure.

FIG. 12 is a diagram illustrating an example of a call screen and a call button according to an embodiment of the present disclosure.

DESCRIPTION OF EMBODIMENTS

Hereinafter, preferred embodiments of the present disclosure will be described in detail with reference to the appended drawings. In this specification and the drawings, elements that have substantially the same function and structure are denoted with the same reference signs, and repeated explanation is omitted.

Figure 1:
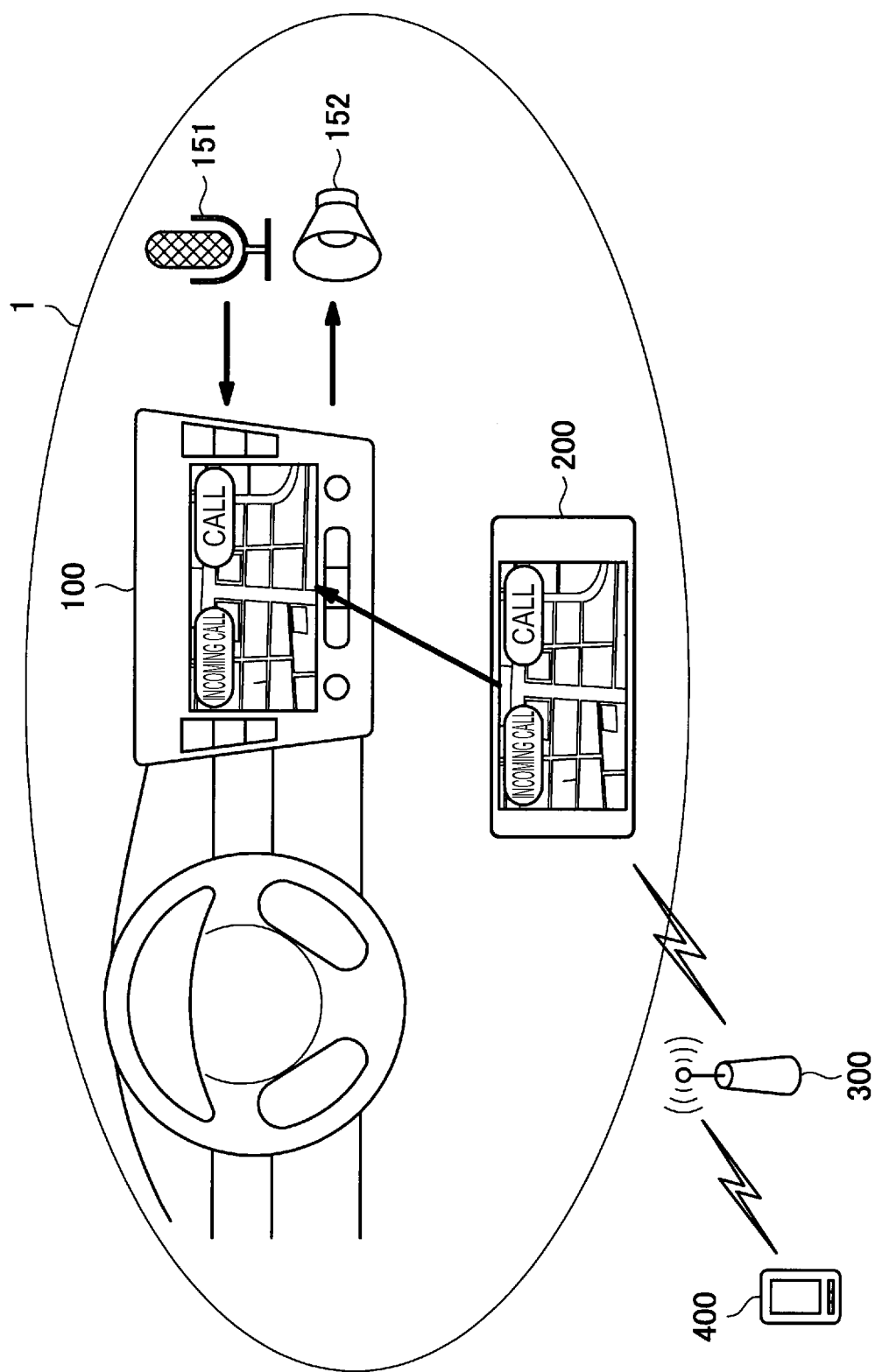
FIG. 1 is an explanatory diagram for explaining outline of a communication system according to a first embodiment.

Note that description will be provided in the following order.
1. Outline of System
2. Configuration Example of Sink Device
3. Configuration Example of Source Device
4. Operation Processing
4-1. Basic Operation
4-2. Specific Example of Operation Processing
4-2-1. Operation of Sink Device upon Incoming Call/Calling 4-2-2. Operation of Source Device upon Incoming Call/Calling
4-3. Flow of Message Transmission/Reception
4-4. Supplement
5. Second Embodiment
6. Third Embodiment
7. Application Examples
7-1. First Application Example
7-2. Second Application Example
8. Conclusion 1. Outline of System FIG. 1 is an explanatory diagram for explaining outline of a communication system (information processing system) 1 according to an embodiment. The communication system 1 includes a sink device (information processing apparatus) 100 and a source device (information processing apparatus) 200. The sink device 100 establishes wireless connection with the source device 200. Further, the sink device 100 can establish wireless connection with an external device 400 by way of the source device 200 and a base station 300.

The sink device is a reception side apparatus which reproduces content received from the source device. In the example of FIG. 1, the sink device 100 is an in-vehicle monitor. The in-vehicle monitor 100 has, for example, a microphone 151 and a speaker 152 for audio input/output. The source device is a transmission side apparatus which transmits content to the sink device. In the communication system 1, content to be transmitted from the source device to the sink device typically includes at least one of video content and audio content. In the example of FIG. 1, the source device 200 is a smartphone. Further, in the example of FIG. 1, the external device 400 is a smartphone. Note that a technology according to the present disclosure is not limited to the illustrated example, but can be applied to arbitrary types of sink device and source device such as, for example, a television apparatus, a projector, a digital still camera, a digital video camera, a tablet personal computer (PC), a desktop PC, a laptop PC, a personal digital assistance (PDA), a mobile phone, a game device, a wearable device and a storage device.

Wireless connection between the sink device 100 and the source device 200 may be formed according to arbitrary types of wireless communication schemes including, for example, a wireless local area network (LAN) scheme such as institute of electrical and electronics engineers (IEEE) 802.11a, 11b, 11g, 11n, 11ac and 11ad, a wireless personal area network (PAN) scheme such as an ultra wideband (UWB) and Zigbee (registered trademark), and a wireless metropolitan area network (MAN) scheme such as IEEE 802.16. Further, it is not necessary to place an intermediate device such as a wireless access point between the sink device 100 and the source device 200. Further, the source device 200 and the external device 400 are wirelessly connected using, for example, a public wireless communication network (for example, the third generation mobile communication system) via the base station 300.

Note that, in the following description, it is assumed as an example, that the sink device 100 and the source device 200 are connected using a wireless LAN scheme, and content is transferred on the wireless LAN connection according to messaging specifications of a Wi-Fi display. As short-range wireless audio visual (AV) transmission communication used for this wireless LAN connection, for example, Miracast can be used. In Miracast, wireless connection is established between the sink device 100 and the source device 200 using Wi-Fi Direct or using connection protocol called tunneled direct link setup (TDLS). It is then possible to transmit sound or a display image to be reproduced at the source device 200 to the sink device 100, and output (mirror) the sound and the image data in a similar manner also at the sink device 100. Furthermore, a control channel for exchanging user input information may be formed between the sink device 100 and the source devices 200. The control channel may be, for example, a Transmission Control Protocol/Internet Protocol (TCP/IP)-based User Input Back Channel (UIBC). Note that content may be transferred using another remote desktop application, for example, virtual network computing (VNC), instead of Wi-Fi Display.

Further, the sink device 100 and the source device 200 may have a Dual-role function which enables content transmission in both directions including transmission from the sink device to the source device as well as content transmission in one direction from the source device to the sink device. According to this function, the sink device 100 and the source device 200 can perform bidirectional Miracast connection and can respectively exert both functions of a function as the sink device and a function as the source device. That is, the sink device 100 can transmit content to another wireless device and make another wireless device reproduce the content as well as receives and reproduces content. In a similar manner, the source device 200 can receive and reproduce content as well as transmits content to another wireless device and make the another wireless device reproduce the content. For example, in the example illustrated in FIG. 1, a case is assumed where the smartphone 200 and the smartphone 400 perform speech communication such as a phone call. Concerning speech from the smartphone 400, the smartphone 200 functions as the source device, and the in-vehicle monitor 100 functions as the sink device. Specifically, the smartphone 200 transmits speech received from the smartphone 400 to the in-vehicle monitor 100, and the in-vehicle monitor 100 outputs the speech of the other party from the speaker 152. On the other hand, concerning user's speech input at the microphone 151, the in-vehicle monitor functions as the source device, and the smartphone 200 functions as the sink device. Specifically, the in-vehicle monitor 100 transmits the user's speech input at the microphone 151 to the smartphone 200, and the smartphone 200 transmits the received user's speech to the smartphone 400. By this means, the communication system 1 enables a speech phone call between the smartphone 200 and the smartphone 400 using the microphone 151 and the speaker 152. While the sink device 100 and the source device 200 can mutually have both functions of a function as the sink device and a function as the source device as described above, the sink device 100 will be described as a sink device, and the source device 200 will be described as a source device unless otherwise indicated.

As described above, in Miracast, a technology regarding content reproduction control is mainly defined, and how the source device and the sink device operate in coordination with each other in response to user operation is still developing. For example, in the example illustrated in FIG. 1, a screen displayed at the smartphone 200 is mirrored to the in-vehicle monitor 100 through utilization of Miracast, and the same screen is displayed at both touch panels. In the example illustrated in FIG. 1, an "incoming call" button and a "call" button are displayed at the both touch panels. The user can answer a phone call incoming from, for example, the external device 400 by touching the "incoming call" button. Further, the user can make a phone call to, for example, the external device 400 by touching the "call"

button. However, even when the user touches a button on the in-vehicle monitor 100 side, the in-vehicle monitor 100 cannot independently recognize and process this user operation. For example, when the user touches an "incoming call" button on the in-vehicle monitor 100 side, the in-vehicle monitor 100 transmits this operation information to the smartphone 200 first and performs various kinds of processing such as activation of the microphone 151 and the speaker 152 according to the returned instruction. Further, even when the in-vehicle monitor 100 side tries to independently recognize user operation, it is difficult to distinguish whether the user operation is performed with respect to the in-vehicle monitor 100 or with respect to the smartphone 200. Therefore, for example, even when it is instructed to increase a volume on the screen mirrored from the smartphone 200, it is difficult for the in-vehicle monitor 100 to distinguish whether to increase a volume of the smartphone 200 or the in-vehicle monitor 100. Accordingly, each embodiment which enables the sink device to directly execute processing according to user operation without the need of recognition of the user operation by the source device and instruction to the sink device will be described in detail in the following sections.

2. Configuration Example of Sink Device

Figure 2:
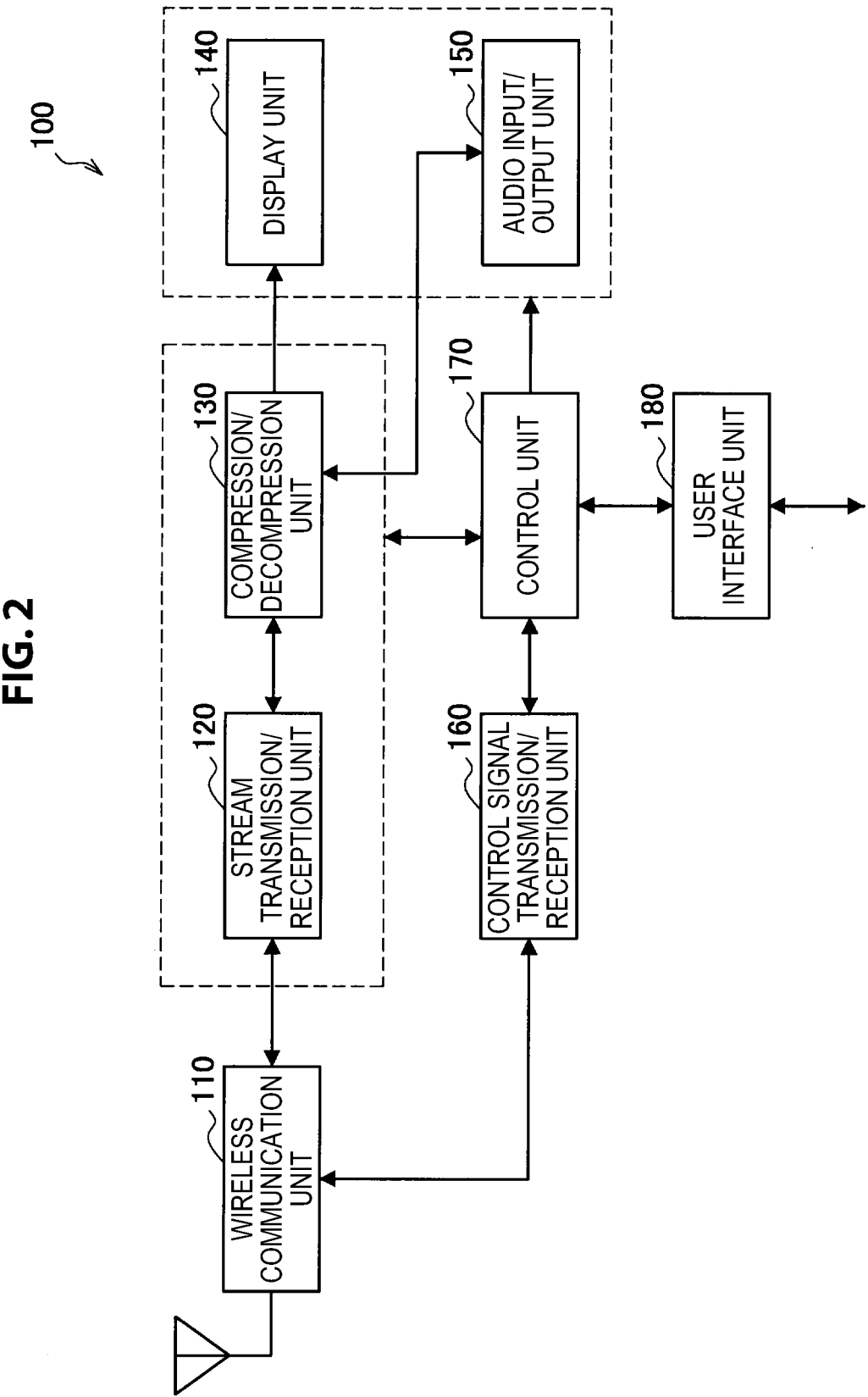
FIG. 2 is a block diagram illustrating an example of a configuration of a sink device according to the first embodiment.

FIG. 2 is a block diagram illustrating an example of a configuration of the sink device 100 according to an embodiment. Referring to FIG. 2, the sink device 100 has a wireless communication unit 110, a stream transmission/reception unit 120, a compression/decompression unit 130, a display unit 140, an audio input/output unit 150, a control signal transmission/reception unit 160, a control unit 170 and a user interface unit 180. Note that, as described above, the sink device 100 can also have a function as the source device, because the function as the source device will be described in detail later in a configuration example of the source device 200, detailed description regarding the function as the source device will be omitted here.

(1) Wireless Communication Unit 110

The wireless communication unit 110 is a wireless interface that mediates wireless communication of the sink device 100 with another apparatus. In the present embodiment, the wireless communication unit 110 establishes wireless connections with the source device 200. In addition, the wireless communication unit 110 receives radio signals including content data transmitted from the source devices 200 on wireless connections via an antenna. The wireless communication unit 110 outputs the received signals including the content data to the stream transmission/reception unit 120. In addition, the wireless communication unit 110 can also perform transmission and reception of control messages (control information) with the source devices 200. Control messages transmitted to the source devices 200 are generated by the control unit 170 that will be described below. In addition, control messages received from the source devices 200 are interpreted by the control unit 170.

The wireless communication unit 110 can use a plurality of frequency channels that have different transfer rates in a parallel or selective manner. A plurality of frequency channels may be, for example, channels each having transfer rates of 2.4 GHz, 5 GHz, and 60 GHz. The wireless communication unit 110 can switch frequency channels to be used for reception of content from each source device 200 according to allocation made by the control unit 170. The wireless communication unit 110 may make a frequency to be used variable by utilizing frequency channel information.

The wireless communication unit 110 may measure connection quality of each frequency channel and output a quality index indicating a measurement result (for example, a received signal intensity, a signal-to-noise ratio (SNR), or the like) to the control unit 170. Of course, frequency channels other than 2.4 GHz, 5 GHz and 60 GHz may be used.

(2) Stream Transmission/Reception Unit 120

The stream transmission/reception unit 120 acquires bit streams of content to be reproduced (for example, video content or audio content) from received signals input from the wireless communication unit 110. Then, the stream acquisition unit 120 outputs the bit streams acquired with respect to the content to be reproduced to the decoding unit 130.

The stream acquisition unit 120 may measure a quality index for evaluating connection quality of a wireless connection for each stream (for example, a bit error rate (BER), a packet error rate (PER), or the like) and output the quality index to the control unit 170.

(3) Compression/Decompression Unit 130

The compression/decompression unit 130 decodes content respectively from bit streams of content received from the source device 200. When the compression/decompression unit 130 decodes video content, the compression/decompression unit 130 outputs the decoded video content to the display unit 140. Further, when the decoding unit 130 decodes audio content, the decoding unit 130 outputs the decoded audio content to the audio input/output unit 150. The compression/decompression unit 130 can decode a plurality of pieces of content in parallel. When the content is compressed and encoded, the content is decompressed through decoding processing at the compression/decompression unit 130. Note that the compression/decompression unit 130 may realize decoding processing with software or may realize decoding processing with hardware.

(4) Display Unit 140

The display unit 140 and the audio input/output unit 150 are used to reproduce content decoded by the compression/decompression unit 130. The display unit 140 displays an image based on image data which is received from the source device 200 by the wireless communication unit 110 and decoded and decompressed by the compression/decompression unit 130. For example, the display unit 140 sequentially outputs frames of the decoded video content. The display unit 140 can adjust display attributes (such as, for example, a frame size) of the video content to be reproduced in accordance with a desired window configuration and specifications of a display of an output destination. By this means, for example, even when screen sizes of the sink device 100 and the source device 200 are different, a screen of an appropriate size can be output by the display unit 140 scaling up and down the image mirrored from the source device 200. Further, there may be a plurality of display units 140, and, for example, the control unit 170 may change the display unit 140 at which frames are output according to definition of each display unit 140, the number of display units 140, or the like. Note that the display unit 140 may be realized with a display panel such as, for example, an organic electro-luminescence (EL) panel and a liquid crystal display (LCD) panel. Further, the display unit 140 may be realized as a touch panel through which the user can perform operation input by touching a display surface with a finger, or the like, or moving a finger, or the like, close to the display surface.

(5) Audio Input/Output Unit 150

The audio input/output unit 150 has a function of inputting and outputting sound, and, for example, is realized with the speaker 152 and the microphone 151 illustrated in FIG. 1. The audio input/output unit 150 sequentially outputs audio signals of audio content decoded and decompressed by the compression/decompression unit 130. There may be a plurality of audio input/output units 150, and, for example, the control unit 170 may change the audio input/output unit 150 at which the audio signals are output according to sound reproduction capability of each audio input/output unit 150, the number of audio input/output units 150, or the like.

(6) Control Signal Transmission/Reception Unit 160

The control signal transmission/reception unit 160 performs transmission processing of transmitting a control signal (control message) output from the control unit 170 which will be described later to another wireless communication apparatus such as, for example, the source device 200 via the wireless communication unit 110. Further, the control signal transmission/reception unit 160 outputs the control message received from another wireless communication apparatus such as, for example, the source device 200 by the wireless communication unit 110 to the control unit 170.

(7) Control Unit 170

The control unit 170 functions as an arithmetic processing unit and a control apparatus, and operates the whole operation within the sink device 100 according to various kinds of programs. For example, the control unit 170 performs negotiation regarding image content and audio content with the source device according to various kinds of setting information input from the user interface unit 180 which will be described later. Specifically, the control unit 170 controls operation of the source device 200 which is a transmission source of content based on a control message received from the control signal transmission/reception unit 160, performance of each apparatus included in the sink device 100, various kinds of setting information input from the user interface unit 180 which will be described later, or the like.

For example, the control unit 170 performs control so that a stream transmitted from the source device 200 does not exceed processing capacity of the sink device 100 itself. Specifically, the control unit 170 may generate a control message for controlling encoding conditions of content at the source device 200 which is a transmission source of content based on required decoding capability required by the content to be reproduced by the display unit 140 and the audio input/output unit 150 and actual decoding capability of the compression/decompression unit 130. Further, the control unit 170 may generate a control message for performing band control of a content stream to be transmitted from the source device 200 which is a transmission source of the content based on setting information regarding a band. Still further, the control unit 170 may change definition of an image to be displayed at the display unit 140 based on setting information regarding definition of the display and generate a control message for requesting a transmission rate equivalent to this definition to the source device 200. Further, for example, the control unit 370 may generate a control signal for changing a display area and a size of an image to be displayed at the display unit 140 based on setting information regarding a screen size of the display. These generated control messages are transmitted to the source device 200 via the control signal transmission/reception unit 160 and reflected in processing at the source device 200.

Note that the user may be notified of content to be changed by these control messages, for example, by the display unit 140. Further, the control unit 170 may have a function regarding block control of the whole communication system 1. For example, the control unit 170 may have a function of performing setting of a frequency channel to be used and definition based on information from the stream transmission/reception unit 120 and the user interface unit 180.

As described above, the control unit 170 generates a control message for negotiation and transmits the control message to the source device 200 via the control signal transmission/reception unit 160. On the other hand, the control unit 170 controls each apparatus included in the sink device 100 based on the control message received from the source device 200.

Various information can be stored in the control message received from the source device 200. For example, the control message includes combination of information specifying a region for which the user interface unit 180 should acquire operation in the image displayed at the display unit 140, information indicating a type of operation to be acquired and information indicating processing to be controlled by the control unit 170 when operation to the region is accepted. Among the combination of information, the first one is also referred to as coordinate information, the second one is also referred to as type information, and the third one is also referred to as command information. Further, a region specified by the coordinate information is also referred to as a command region. The command region specified by the coordinate information can take various shapes including, for example, a rectangle, a rounded rectangle, a triangle, a circle, and the like. Types of operation indicated by the type information can include various operation such as, for example, single-point touch, multipoint touch, swipe, pinch-in and pinch-out. The control unit 170 performs control to perform processing indicated in the command information when user operation matching the type information is acquired at the command region. Processing indicated in the command information can include various processing such as, for example, calling, incoming call, transmission/reception of e-mail, environment setting of hardware or software of the sink device 100 regarding Internet browsing and ON/OFF processing. The control unit 170 controls each apparatus within the sink device 100 so as to perform processing according to the command information in response to user operation to the command region acquired by the user interface unit 180. Note that controlling each apparatus within the sink device 100 so as to perform processing according to the command information by the control unit 170 is also simply referred to as executing a command in the following description. Further, the combination of the coordinate information, type information and the command information is also referred to as behavior setting information, and the control message including the behavior setting information is also referred to as an behavior setting message in the following description. Specific examples of the command region and the command information will be specifically described with reference to FIG. 3.

FIG. 3 is a diagram for explaining the command region and the command information. A left diagram in FIG. 3 illustrates a screen of the source device 200, and a right diagram in FIG. 3 illustrates a screen of the sink device 100. Note that it is assumed that the screen of the sink device 100 is displayed on the touch panel. As illustrated in FIG. 3, the screen of the source device 200 is mirrored to the sink device 100, and an incoming call button is displayed. Here, a case will be considered where a behavior setting message including combination of coordinate information of the incoming call button, type information indicating touch operation and command information indicating processing to be performed when the incoming call button is touched is received from the source device 200. The coordinate information specifies a region of the incoming call button which is a command region by, for example, upper left coordinate (X1, X2) and lower right coordinate (X2, Y2). The control unit 170, for example, turns on the microphone 151 when the incoming call button is manipulated and enables audio input by the audio input/output unit 150 based on this behavior setting message. Then, the sink device 100 can transmit microphone sound acquired by the microphone 151 to the other party of a speech phone call by fulfilling a function as the source device which will be described later.

The behavior setting message may include flag information indicating whether the behavior setting information is valid or invalid. The control unit 170 executes a command when a command region relating to valid behavior setting information is touched. Meanwhile, when the control unit 170 is notified that the behavior setting information is invalid from the source device 200, even when a command region relating to invalid behavior setting information is touched, the control unit 170 does not execute a command. That is, the control unit 170 monitors user operation to the command region from when the control unit 170 is notified that the behavior setting information is valid until when the control unit 170 is notified that the behavior setting information is invalid and executes the command when designated user operation is acquired. In the following description, a message in which the flag information is valid, that is, a message for validating the behavior setting information among the behavior setting message is also referred to as a validation message. Further, a message in which the flag information is invalid, that is, a message for invalidating the behavior setting information is also referred to as an invalidation message. In the following description, an example of the behavior setting message regarding the incoming call button illustrated in FIG. 3 will be indicated.

<Validation Message>
Coordinate information: (X1, Y1)=(10, 300), (X2, Y2)= (100, 400)
Type information: (touch)
Command information: (incoming call)
Flag information: (valid)
<Invalidation Message>
Coordinate information: (X1, Y1)=(10, 300), (X2, Y2)= (100, 400)
Type information: (touch)
Command information: (incoming call)
Flag information: (invalid)

The control unit 170 monitors a region specified by the coordinate (10, 300) and the coordinate (100, 400) as the command region from when the validation message is received until when the invalidation message is received, and executes a command regarding incoming call when the region is touched. Note that the behavior setting message may include a plurality of pieces of behavior setting information, and valid behavior setting information and invalid behavior setting information may be mixed. Further, the control unit 170 has a function of converting coordinate of the command region according to a difference of definition, a screen size, a display direction, or the like, of the display. Therefore, the coordinate of the command region at the sink device 100 may be the same as or different from the coordinate of the incoming call button at the source device 200.

Here, there is a case where it is necessary to perform processing which cannot be performed by the sink device 100 alone and which is performed in coordination with the source device 200 depending on a command to be executed. In this case, the control unit 170 transmits a message for making the source device 200 execute processing corresponding to processing indicated in the command information to the source device 200 via the wireless communication unit 110. This message is also referred to as a coordination request message in the following description. The coordination request message may include information indicating processing to be executed by the source device 200. Further, the coordination request message may simply include operation information indicating user operation acquired by the user interface unit 180, and the source device 200 may judge processing to be executed based on the operation information. For example, the control unit 170 controls the control signal transmission/reception unit 160 and transmits such a coordination request message using UIBC on TCP/IP. When the incoming call button is touched, the control unit 170 controls the control signal transmission/reception unit 160 to transmit a coordination request message including the operation information on UIBC, and the source device 200 performs processing regarding incoming call of a speech phone call based on the operation information. For example, in the case of incoming call, the source device 200 establishes communication with the external device 400 which is a call originator, or the like. By this means, it is possible to perform a speech phone call by the sink device 100 while communication is established by the source device 200. Here, while incoming call has been described with reference to FIG. 3, for example, calling is performed in a similar manner. Further, as another example of the coordination request message, the control unit 170 may transmit a message for PAUSE setting or a message for PLAY setting of RTSP. For example, the control unit 170 can avoid useless communication by establishing Miracast connection, performing PAUSE setting while content is not transmitted/received and performing PAUSE cancel setting (PLAY setting) while content is transmitted/received.

In addition, the control unit 170 may transmit/receive a control message including a command (such as, for example, reproduction start, reproduction stop, fast-forward and rewind) relating to reproduction of content via a control channel between the devices. The control unit 170 can control operation of the display unit 140 and the audio input/output unit 150 in response to detection of such a command.

(8) User Interface Unit 180

The user interface unit 180 accepts user input via an input device (which is not illustrated) of the sink device 100. The user interface unit 180 may accept an input signal generated at specific hardware such as, for example, a remote controller, a touch panel, a keyboard, a mouse, a button and a switch as user input. Further, the user interface unit 180 may accept an audio command acquired through a microphone, a gesture command acquired through a camera or a sensor command acquired through various kinds of sensors such as a gyro sensor and a motion sensor as user input. The user interface unit 180 according to the present embodiment functions as an acquisition unit which acquires operation to the command region in an image displayed by the display unit 140, indicated in the behavior setting message received from the source device 200 by the wireless communication unit 110. In the present specification, the user interface unit 180 will be described as being realized with a touch panel integrally formed with the display unit 140. The user interface unit 180 outputs the accepted user input to the control unit 170.

The configuration example of the sink device 100 has been described above. Subsequently, a configuration example of the source device 200 will be described with reference to FIG. 4.

3. Configuration Example of Source Device

Figure 4:
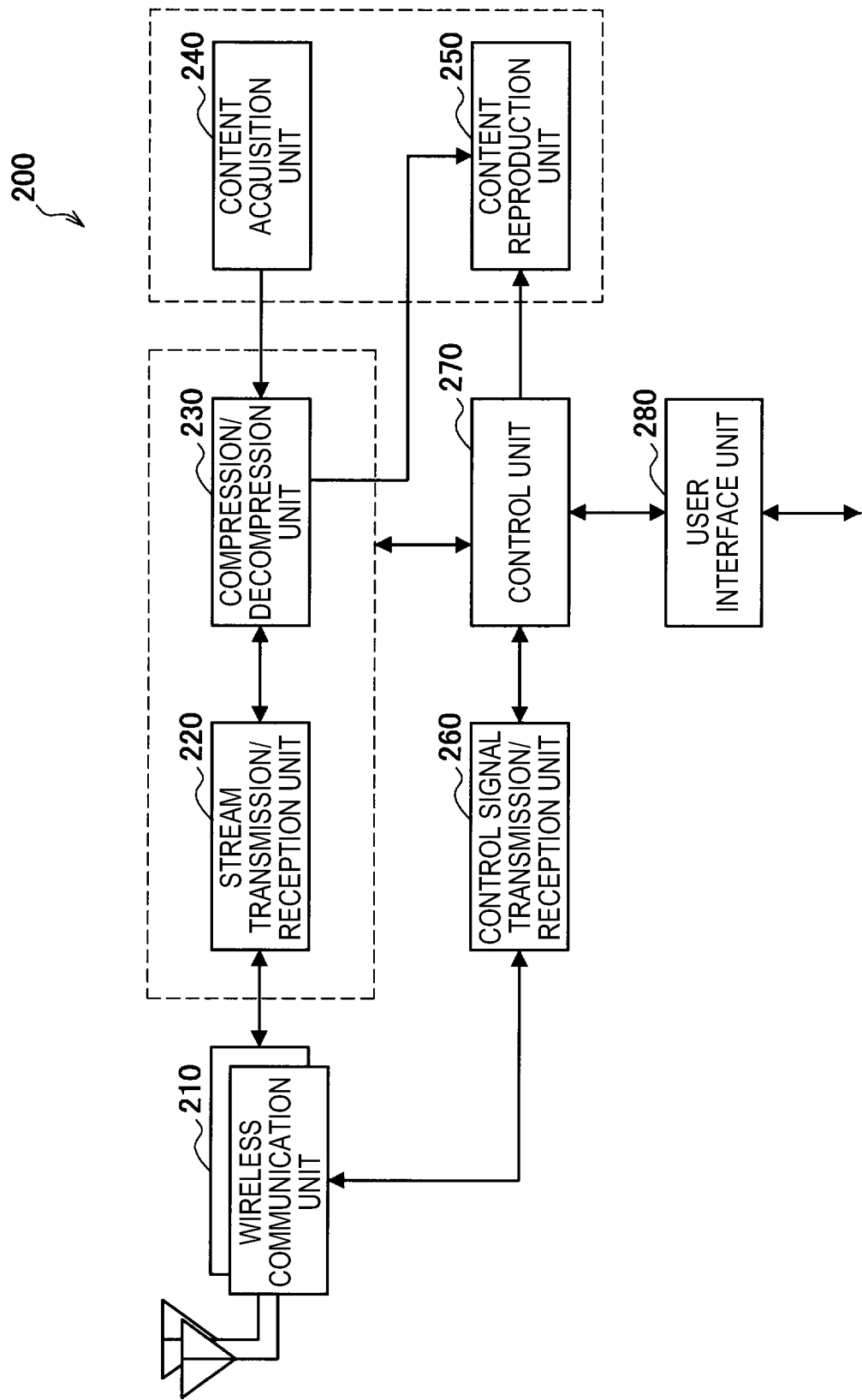
FIG. 4 is a block diagram illustrating an example of a configuration of a source device according to the first embodiment.

FIG. 4 is a block diagram illustrating an example of a configuration of the source device 200 according to an embodiment. Referring to FIG. 4, the source device 200 has a wireless communication unit 210, a stream transmission/reception unit 220, a compression/decompression unit 230, a content acquisition unit 240, a content reproduction unit 250, a control signal transmission/reception unit 260, a control unit 270 and a user interface unit 280. Note that, as described above, while the source device 200 can also have a function as the sink device, the function as the sink device has been described in detail above in the configuration example of the sink device 100, detailed description regarding the function as the sink device will be omitted here. Note that it is also possible to regard the wireless communication unit 210 of the source device 200 as a first wireless communication unit and regard the wireless communication unit 110 of the sink device 100 as a second wireless communication unit. Further, it is also possible to regard the control unit 270 of the source device 200 as a first control unit and regard the control unit 170 of the sink device 100 as a second control unit.

(1) Wireless Communication Unit 210

The wireless communication unit 210 is a wireless interface that mediates wireless communication of the source device 200 with another apparatus. In the present embodiment, the wireless communication unit 210 establishes wireless connections with the sink device 100. The wireless communication unit 210 transmits radio signals including content data generated by the stream transmission/reception unit 220 to the sink device 100 on wireless connections through an antenna. In addition, the wireless communication unit 210 can also transmit and receive radio signals including control messages to and from the sink device 100. Control messages transmitted to the sink device 100 are generated by the control unit 270 which will be described below. Furthermore, the control messages received from the sink device 100 are interpreted by the control unit 270.

Further, the wireless communication unit 210 establishes wireless connection with the external device 400 using a public wireless communication network (for example, the third generation mobile communication system). The wireless communication unit 210 transmits a radio signal including content data generated by the stream transmission/reception unit 220 to the external device 400 on wireless connection via an antenna. Further, the wireless communication unit 210 receives a radio signal including content data from the external device 400 on wireless connection via an antenna.

(2) Stream Transmission/Reception Unit 220

The stream transmission/reception unit 220 transmits bit streams of encoded content input from the compression/decompression unit 230 to be described below to the sink device 100 via the wireless communication unit 210. The stream transmission/reception unit 220 may generate multimedia streams by multiplexing streams of video content and streams of audio content and transmit the generated multimedia streams.

(3) Compression/Decompression Unit 230

The compression/decompression unit 230 encodes content to be transmitted to the sink device 100 input from the content acquisition unit 240 to be described below and thereby generates bit streams of the content. Then, the compression/decompression unit 230 outputs the generated bit streams to the stream transmission/reception unit 220. Encoding conditions of content of the compression/decompression unit 230 are controlled by the encoding control unit 270 based on a control message received from the sink device 100. Encoding conditions for video content can include, for example, the codec type of a video codec in use, definition, a frame rate, and a level of image quality. Encoding conditions for audio content can include the codec type of an audio codec in use, a sampling rate, and a level of sound quality. When instructed not to perform compression encoding on content, the compression/decompression unit 230 may generate bit streams of content in a non-compression format without compressing the content.

The compression/decompression unit 230 may have one or more encoding circuits as hardware. In addition, the compression/decompression unit 230 may have a processor that can execute software modules for video encoding and audio encoding. Furthermore, the compression/decompression unit 230 may have both an encoding circuit as hardware and a processor that can execute the software modules. The compression/decompression unit 230 can support any codec type.

(4) Content Acquisition Unit 240

The content acquisition unit 240 acquires content to be provided to the sink device 100 from a storage unit (not shown) or other data sources, and outputs the acquired content to the compression/decompression unit 230. Other data sources can include, for example, a camera and a microphone of the source device 200 or a remote device that the source device 200 can access (for example, a content server or a web camera with a microphone) or the external device 400 wirelessly connected to the source device 200. What content should be provided to the sink device 100 can be designated through a user input detected by the user interface unit 280 or a control message received from the sink device 100. When acquired content has been encoded with a codec of a type that is different from an encoding condition designated by the sink device 100, the content acquisition unit 240 may decode the content first and output the content to the compression/decompression unit 230.

(5) Content Reproduction Unit 250

The content reproduction unit 250 has a function of reproducing content which is received from the sink device 100 or the external device 400 via the wireless communication unit 210 and which is decoded by the compression/decompression unit 230. For example, the content reproduction unit 250 can be realized with a display panel such as an organic EL panel and an LCD panel. Further, the content reproduction unit 250 may be realized as a touch panel which can perform operation input by the user touching a display surface with a finger, or the like, or the user moving a finger, or the like, close to the display surface. In addition, the content reproduction unit 250 can be realized with, for example, a speaker. Note that sound and an image may be output from both the sink device 100 and the source device 200. However, it is preferable to output sound from only one of the sink device 100 and the source device 200 through negotiation using a control message.

(6) Control Signal Transmission/Reception Unit 260

The control signal transmission/reception unit 260 performs transmission processing of transmitting a control message output from the control unit 270 which will be described later to another wireless communication apparatus such as, for example, the sink device 100 via the wireless communication unit 210. Further, the control signal transmission/reception unit 260 outputs a control message received from another wireless communication apparatus such as, for example, the sink device 100 by the wireless communication unit 210 to the control unit 270.

(7) Control Unit 270

The control unit 270 functions as an arithmetic processing unit and a control apparatus and controls the whole operation within the source device 200 according to various kinds of programs. For example, the control unit 270 performs negotiation regarding image content and audio content with the sink device 100 and controls each apparatus within the source device 200 to operate based on the negotiation result.

For example, the control unit 270 controls encoding conditions of content at the compression/decompression unit 230 based on the control message received from the sink device 100. Further, the control unit 270 may perform control for changing definition of the image data to be transmitted or control for changing an image region of the image data to be transmitted based on the control message. Further, the control unit 270 may perform band control of media streams to be transmitted based on the control message. To perform this band control, the control unit 270 may measure a quality index (such as, for example, BER and PER) for evaluating connection quality of wireless connection with the sink device 100.

Further, the control unit 270 may control the whole communication system 1 according to a result of negotiation with the sink device 100. For example, the control unit 270 may further control a frequency channel of wireless connection with the sink device 100. For example, the control unit 270 acquires a power supply state of each apparatus (such as, for example, whether each apparatus is battery-powered or connected to a power supply, and battery charge remaining) within the communication system 1 through message exchange with the sink device 100. The control unit 270 may then, for example, select a frequency channel to be used to suppress battery consumption at the battery-powered source device 200. Further, when it is recognized that a bit rate of content to be transmitted to the sink device 100 becomes higher, a frequency channel with a higher transfer rate (or with more favorable connection quality) may be allocated to wireless connection with the sink device 100.

The control unit 270 can also control operation at the sink device 100 through message exchange with the sink device 100. Messages to be transmitted to the sink device 100 can include, for example, a behavior setting message. The source device 200 monitors screen transition, or the like, of a screen displayed at the sink device 100, transmits a validation message when a region which allows operation is displayed, and transmits an invalidation message when the region is hidden. A region which allows operation can include, for example, a call button, an e-mail transmission/reception button, various kinds of operation buttons for Internet browser, or the like, in addition to the incoming call button illustrated in FIG. 3. Of course, a region which allows operation can include a region which allows arbitrary operation such as swipe operation in addition to the buttons.

For example, first, the control unit 270 monitors the content acquisition unit 240 and determines whether or not a region which allows operation is included in an image displayed at the sink device 100 through content transmission by the wireless communication unit 210. When the region which allows operation is included, the control unit 270 transmits a behavior setting message relating to the region to the sink device 100. Specifically, the control unit 270 generates a validation message including behavior setting information formed with combination of coordinate information specifying this region, type information indicating a type of operation to be acquired and command information indicating processing to be executed by the sink device 100 when operation to this region is acquired. The control unit 270 then transmits the generated validation message to the sink device 100 via the wireless communication unit 210. Meanwhile, the control unit 270 monitors the content acquisition unit 240 and determines whether a region which allows operation is no longer included, for example, by screen transition, or the like, in the image displayed at the sink device 100 through content transfer by the wireless communication unit 210. When the region which allows operation is no longer included, the control unit 270 generates an invalidation message including behavior setting information relating to this region. The control unit 270 then transmits the generated invalidation message to the sink device 100 via the wireless communication unit 210. Note that the wireless communication unit 210 may transmit this behavior setting message using a message obtained by extending one of messages defined by Miracast or may transmit other messages which are not defined.

Further, the message received from the sink device 100 can include the above-described coordination request message which requests processing corresponding to the command executed at the sink device 100. When the coordination request message is received via the wireless communication unit 210, the control unit 270 controls each apparatus within the source device 200 so as to execute the processing indicated in the received coordination request message. In the example illustrated in FIG. 3, when the incoming call button is touched at the sink device 100, the control unit 270 controls each apparatus within the source device 200 so as to perform processing corresponding to incoming call. For example, the control unit 270 controls the wireless communication unit 210 so as to establish wireless connection with the external device 400 based on the coordination request message including the operation information. In addition, the control unit 270 may perform PAUSE setting or PAUSE cancel setting (PLAY setting) for transmission/reception of content based on the message for PAUSE setting or the message for PLAY setting of RTSP.

Further, when user input relating to reproduction of content is detected at the user interface unit 280, the control unit 270 may transmit a control message including a command corresponding to the detected user input to the sink device 100 via a control channel between the devices. For example, when a source device 200 is selected as an idle device, a control message instructing a stop of reproduction of content can be received by the wireless communication unit 210 thereof. In this case, the control unit 270 may cause an operation mode of the source device 200 to transition to a standby mode and partially stop power supply to each unit of the source device 200 during the period of the standby mode. In the standby mode, the wireless communication unit 210 can operate, for example, intermittently, and can receive control messages from the sink device 100 in active periods periodically. In other words, a wireless connection between the sink device 100 and the source device 200 can be maintained during the period of the standby mode as well. Upon receiving a control message instructing a start of reproduction of content during the period of the standby mode, the control unit 270 can return the operation mode of the source device 200 to an active mode.

(8) User Interface Unit 280

The user interface unit 280 accepts user input via an input device (not shown) of the source device 200. The user interface unit 280 may accept an input signal generated at specific hardware such as, for example, a remote controller, a touch panel, a keyboard, a mouse, a button and a switch as the user input. Further, the user interface unit 280 may accept an audio command acquired through a microphone, a gesture command acquired through a camera, and a sensor command acquired through various kinds of sensors such as a gyro sensor and a motion sensor as the user input. In the present specification, description will be provided assuming that the user interface unit 280 is realized with a touch panel which is integrally formed with a display. The user interface unit 280 outputs the accepted user input to the control unit 270.

The configuration example of the source device 200 has been described above. Subsequently, operation processing by the communication system 1 will be described.

4. Operation Processing

[4-1. Basic Operation]

First, basic operation processing of the sink device 100 and the source device 200 will be described with reference to FIG. 5 and FIG. 6.

(Basic Operation of Sink Device 100)

Figure 5:
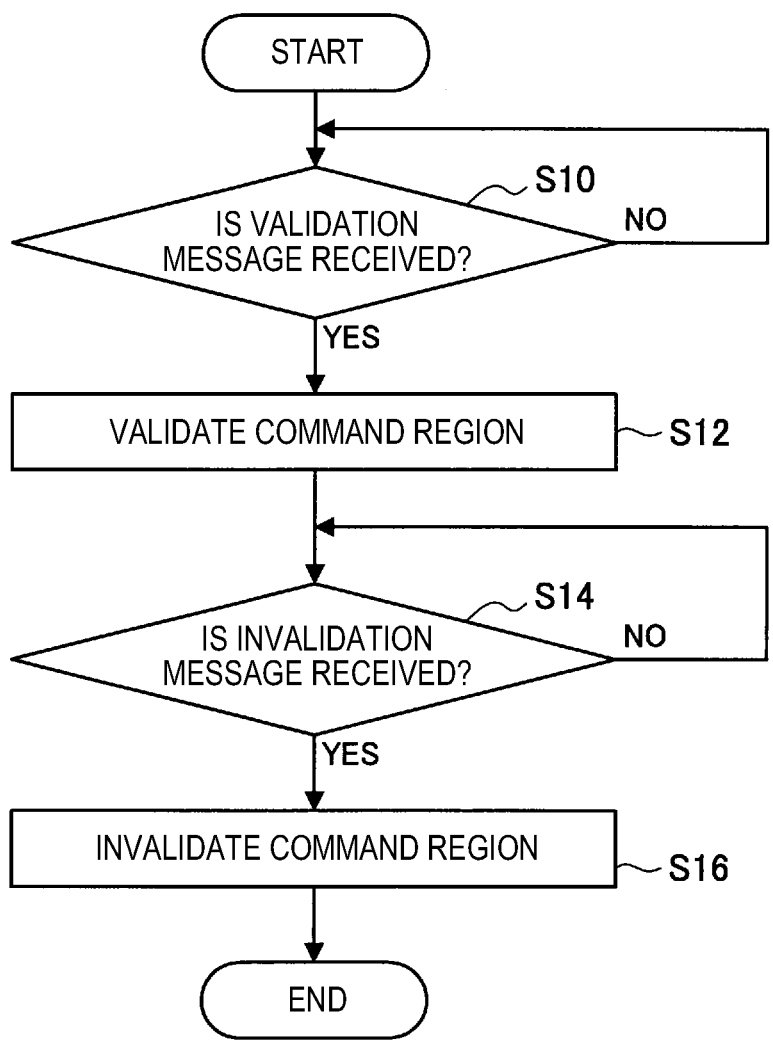
FIG. 5 is a diagram illustrating an example of flow of basic operation processing executed by the sink device according to the first embodiment.

FIG. 5 is a diagram illustrating an example of flow of basic operation processing executed by the sink device 100 according to the present embodiment. Referring to FIG. 5, first, the control unit 170 of the sink device 100 determines whether or not a validation message from the source device 200 is received by the control signal transmission/reception unit 160 (step S10). When it is determined that a validation message is not received (step S10/No), the processing returns to step S10 again, where the control unit 170 repeats confirmation of reception of a validation message. On the other hand, when it is determined that a validation message is received (step S10/Yes), the control unit 170 validates a command region (S12). Specifically, the control unit 170 starts monitoring of user operation to the command region. Subsequently, the control unit 170 determines whether or not an invalidation message relating to the command region is received from the source device 200 by the control signal transmission/reception unit 160 (step S14). When it is determined that an invalidation message is not received (step S14/No), the processing returns to step S14 again, where the control unit 170 continues to monitor the command region. When user operation matching type information to the command region is acquired by the user interface unit 180 during monitoring, the control unit 170 transmits a coordination request message to the source device 200 while executing a command designated in the validation message. On the other hand, when it is determined that an invalidation message is received (step S14/Yes), the control unit 170 invalidates the command region (step S16). Specifically, the control unit 170 stops monitoring of the user operation to the command region. Note that a plurality of messages can be processed through this operation processing.

(Basic Operation of Source Device 200)

Figure 6:
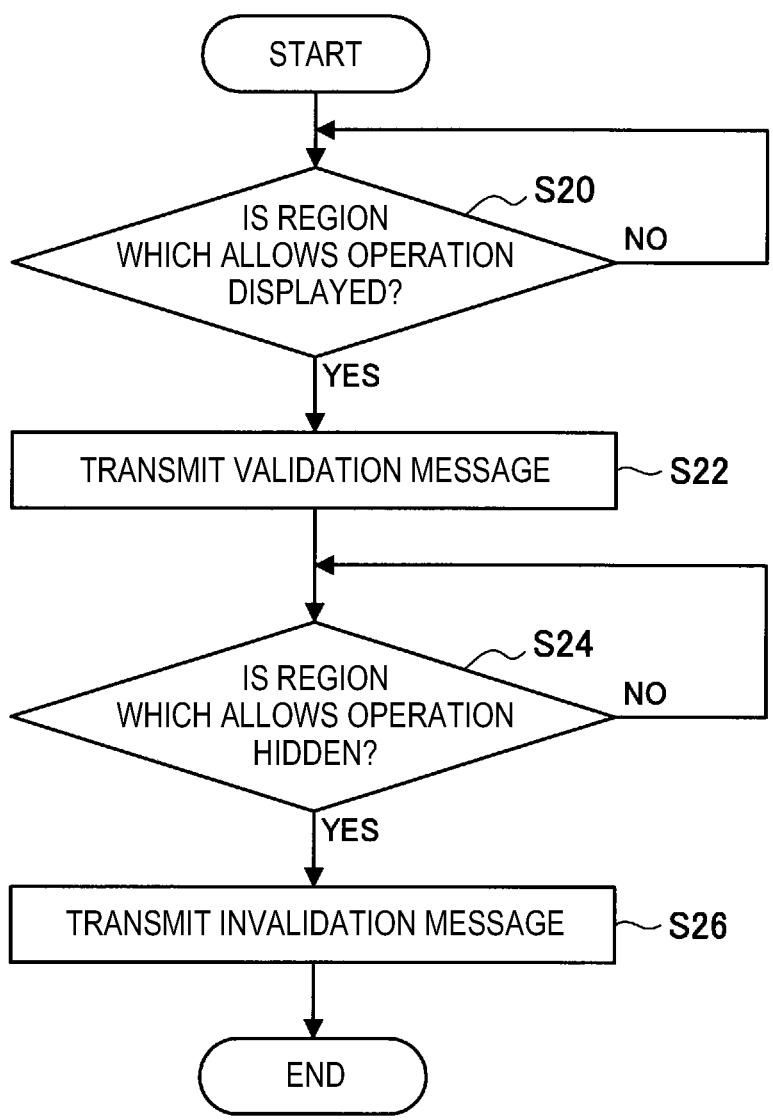
FIG. 6 is a diagram illustrating an example of flow of basic operation processing executed by the source device according to the first embodiment.

FIG. 6 is a diagram illustrating an example of flow of basic operation processing executed by the source device 200 according to the present embodiment. Referring to FIG. 6, first, the control unit 270 of the source device 200 monitors screen transition, or the like, of a screen displayed at the sink device 100 to determine whether or not a region which allows operation is displayed (step S20). When it is determined that a region which allows operation is not displayed (step S20/No), the processing returns to step S20 again, where the control unit 270 continues to monitor a screen displayed at the sink device 100. On the other hand, when it is determined that a region which allows operation is displayed (step S20/Yes), the control unit 270 generates a validation message including behavior setting information designating the region as a command region and transmits the validation message to the sink device 100 via the wireless communication unit 210 (step S22). Subsequently, the control unit 270 monitors screen transition, or the like, of a screen displayed at the sink device 100 to determine whether or not the displayed region which allows operation is hidden (step S24). When it is determined that the region which allows operation is continuously displayed (step S24/No), the processing returns to step S24 again, where the control unit 270 continues to monitor the screen displayed at the sink device 100. On the other hand, when it is determined that the region which allows operation is hidden (step S24/Yes), the control unit 270 generates an invalidation message relating to the region and transmits the invalidation message to the sink device 100 via the wireless communication unit 210 (step S26). Note that a plurality of messages can be processed through this operation processing.

[4-2. Specific Example of Operation Processing]

Subsequently, specific operation processing of the sink device 100 and the source device 200 will be described with reference to FIG. 7 to FIG. 10. Here, flow of incoming call processing and calling processing executed at the sink device 100 and the source device 200 which is triggered by touch operation performed at the sink device 100 will be described as an example.

[4-2-1. Operation of Sink Device 100 upon Incoming Call/Calling]

Figure 7:
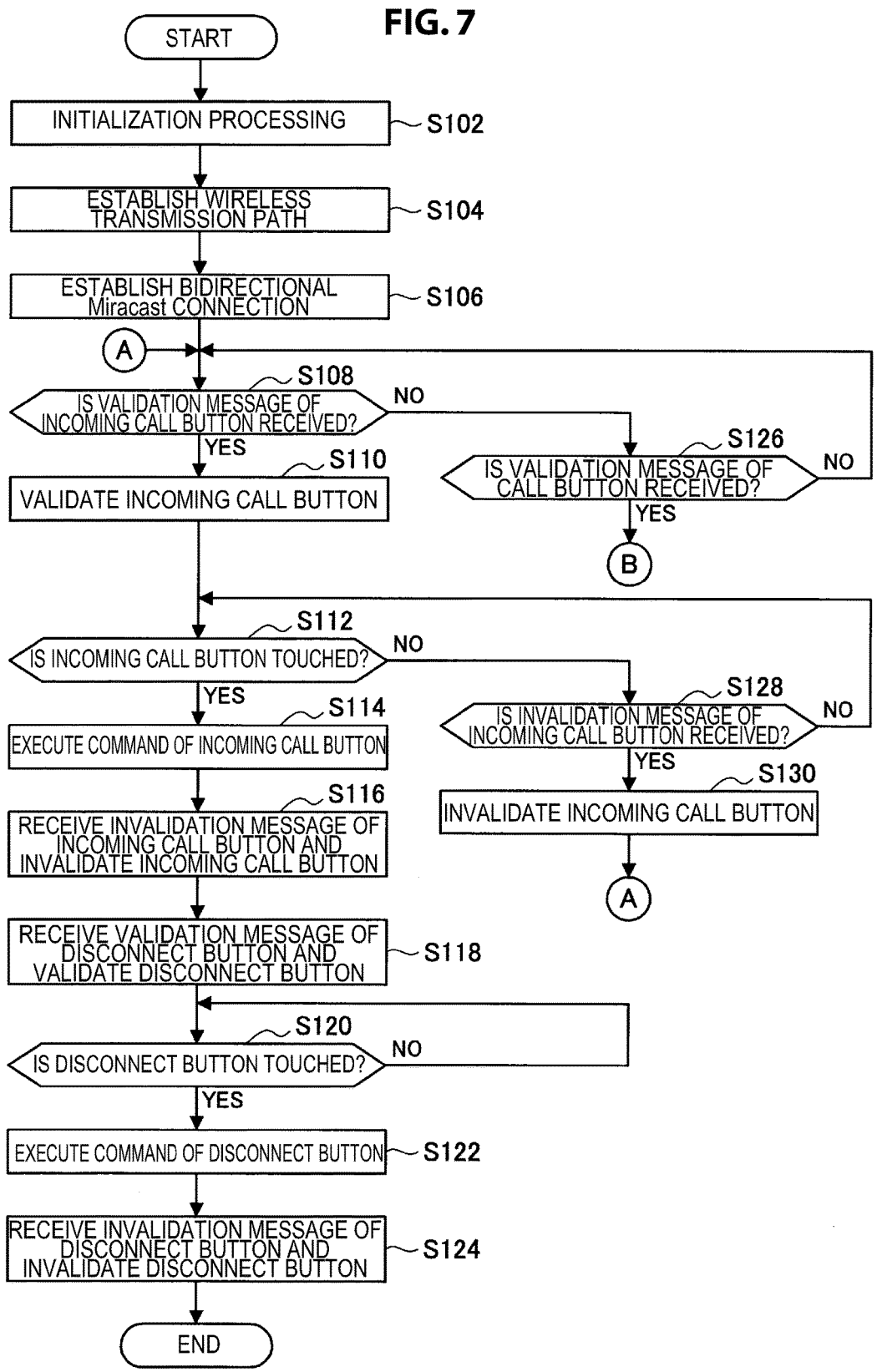
FIG. 7 is a diagram illustrating an example of flow of incoming call processing and calling processing executed by the sink device according to the first embodiment.
Figure 8:
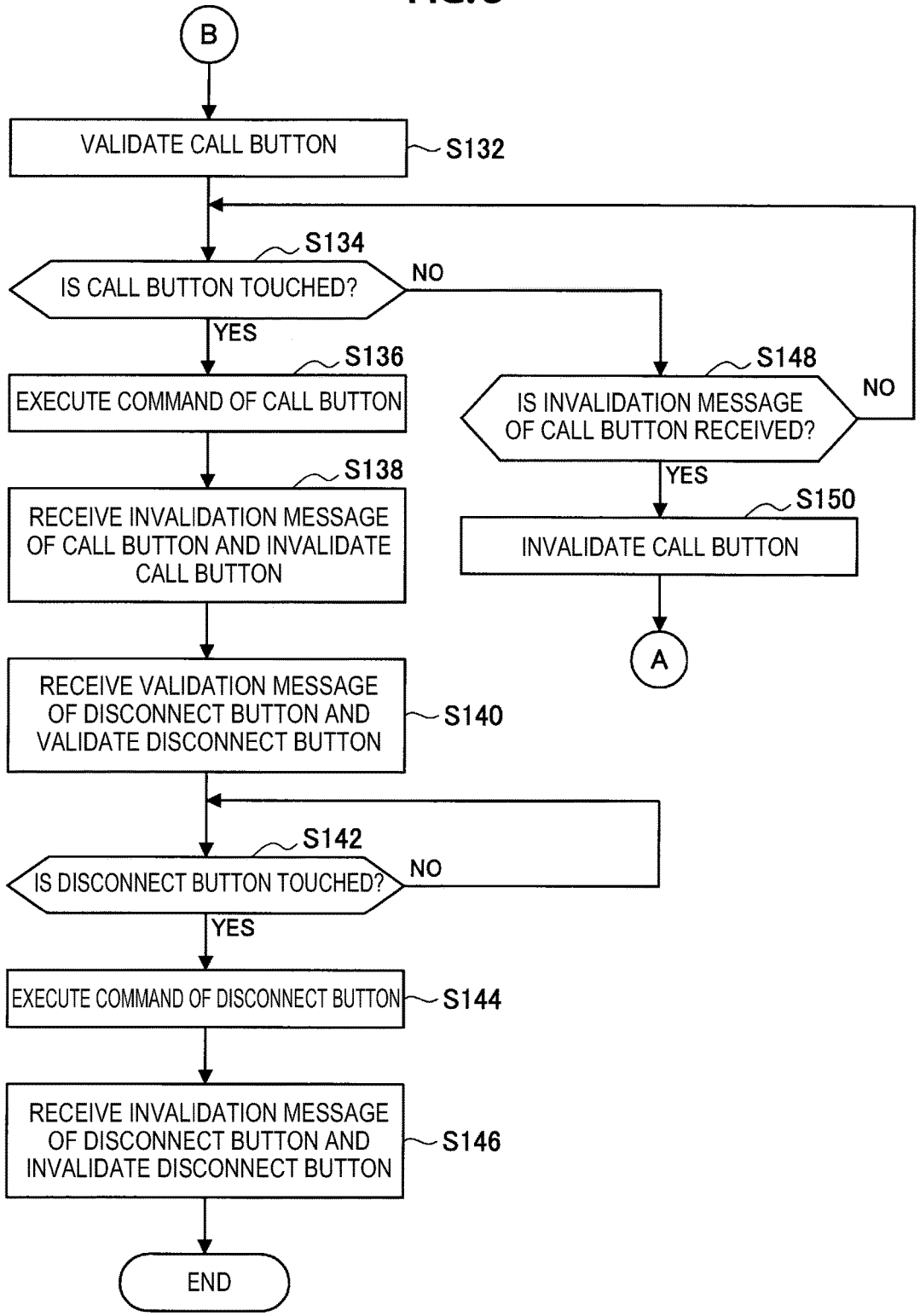
FIG. 8 is a diagram illustrating an example of flow of incoming call processing and calling processing executed by the sink device according to the first embodiment.

FIG. 7 and FIG. 8 are diagrams illustrating examples of flow of incoming call processing and calling processing executed by the sink device 100 according to the present embodiment.

Referring to FIG. 7, first, the control unit 170 of the sink device 100 performs initialization processing and preparation processing of each apparatus within the sink device 100 (step S102). Subsequently, the control unit 170 controls the wireless communication unit 110 to establish wireless connection with the wireless communication unit 210 of the source device 200 (step S104). The wireless communication unit 110 then establishes bidirectional Miracast connection with the source device 200 (step S106). Specifically, first, the control unit 170 controls the control signal transmission/reception unit 160 and performs various kinds of negotiation by transmitting/receiving a control message to/from the control signal transmission/reception unit 260 of the source device 200. The control unit 170 then controls the stream transmission/reception unit 120 and the compression/decompression unit 130 to decode content data from a radio signal received from the source device 200 by the wireless communication unit 110 and output the content data from the display unit 140 and the audio input/output unit 150. Through this processing, the sink device 100 can operate as a sink device and reproduce content transmitted from a source device. Further, the control unit 170 controls the compression/decompression unit 130 and the stream transmission/reception unit 120 to convert the audio data acquired by the audio input/output unit 150 into a radio signal and transmits the radio signal to the source device 200 via the wireless communication unit 110. Through this processing, the sink device 100 can operate as a source device and reproduce content transmitted to the source device 200 which functions as a sink device. Such bidirectional connection enables speech of the other party to be reproduced using the speaker 152 and user speech acquired by the microphone 151 to be transferred to the other party upon, for example, a speech phone call such as a phone call. Here, while a speech phone call is not performed, because it is not necessary to transmit microphone sound from the sink device 100 to the source device 200, it is preferable that the control unit 170 performs PAUSE setting of Miracast and suspends transmission of audio data to the source device 200. Note that the message for PAUSE can be realized using an M9 message of real time streaming protocol (RTSP).

The control unit 170 then determines whether or not a validation message of the incoming call button is received by the control signal transmission/reception unit 160 (step S108). When it is determined that the validation message is not received (step S108/No), the control unit 170 determines whether or not a validation message of the call button is received by the control signal transmission/reception unit 160 (step S126). When it is determined that neither of the messages is received (step S126/No), the processing returns to step S108 again.

When it is determined that the validation message of the incoming call button is received (step S108/Yes), the control unit 170 validates the incoming call button (step S110). For example, the control unit 170 starts monitoring whether or not touch to the command region of the incoming call button specified by coordinate information included in the validation message of the incoming call button is acquired by the user interface unit 180.

When the incoming call button is not touched (step S112/No), the control unit 170 determines whether or not an invalidation message of the incoming call button is received by the control signal transmission/reception unit 160 (step S128). When it is determined that an invalidation message is not received (step S128/No), the processing returns to step S112 again, where the control unit 170 continues to monitor touch to the incoming call button. On the other hand, when it is determined that an invalidation message is received (step S128/Yes), the control unit 170 invalidates the incoming call button (step S130). Specifically, the control unit 170 stops monitoring whether or not touch to the command region of the incoming call button specified by coordinate information included in the invalidation message of the incoming call button is acquired by the user interface unit 180. The processing then returns to step S108 again.

When the incoming call button is touched (step S112/Yes), the control unit 170 executes a command of the incoming call button indicated by the command information included in the validation message of the incoming call button (step S114). For example, the control unit 170 turns on the microphone 141 to validate audio input. Further, the control unit 170 performs PAUSE cancel setting (PLAY setting) of Miracast and resumes audio data transmission to the source device 200. Further, the control unit 170 controls the control signal transmission/reception unit 160 to transmit a coordination request message relating to the incoming call button to the source device 200. For example, the control unit 170 transmits a message including operation information indicating that the incoming call button is touched and a message for PLAY setting as the coordination request message. Note that the message for PALY setting can be realized using an M7 message of RTSP. By this means, for example, wireless connection between the source device 200 and the incoming call party is established, so that a speech phone call is started. Therefore, for example, a screen transitions from an incoming call screen to a speech phone call screen, and the incoming call button is hidden and a disconnect button is displayed. In accordance with this, the source device 200 transmits an invalidation message of the incoming call button and a validation message of the disconnect button to the sink device 100. When the invalidation message of the incoming call button is received by the control signal transmission/reception unit 160, the control unit 170 invalidates the incoming call button (step S116).

Further, when the validation message of the disconnect button is received by the control signal transmission/reception unit 160, the control unit 170 validates the disconnect button (step S118). Specifically, the control unit 170 starts monitoring whether or not touch to the command region of the disconnect button specified by coordinate information included in the validation message of the disconnect button is acquired by the user interface unit 180. When the disconnect button is not touched (step S120/No), the processing returns to step 120 again, where the control unit 170 continues to monitor touch to the disconnect button. On the other hand, when the disconnect button is touched (step S120/Yes), the control unit 170 executes a command of the disconnect button indicated in command information included in the validation message of the disconnect button (step S122). For example, the control unit 170 turns off the microphone 151 to invalidate audio input. Further, the control unit 170 performs PAUSE setting of Miracast and suspends audio data transmission to the source device 200. Still further, the control unit 170 controls the control signal transmission/reception unit 160 to transmit a coordination request message relating to the disconnect button to the source device 200. For example, the control unit 170 transmits a message including operation information indicating that the disconnect button is touched and a message for PAUSE setting as the coordination request message. By this means, wireless connection between the source device 200 and the incoming call party is disconnected, so that a speech phone call ends. Therefore, for example, the screen transitions from the speech phone call screen to a menu screen, and the disconnect button is hidden. In accordance with this, the source device 200 transmits an invalidation message of the disconnect button to the sink device 100. When the invalidation message of the disconnect button is received by the control signal transmission/reception unit 160, the control unit 170 invalidates the disconnect button (step S124). Specifically, the control unit 170 stops monitoring whether or not touch to the command region of the disconnect button specified by coordinate information included in the invalidation message of the disconnect button is acquired by the user interface unit 180.

When it is determined that a validation message of the call button is received after Miracast connection is established (step S106) (step S126/Yes), referring to FIG. 8, the control unit 170 validates the call button (step S132). For example, the control unit 170 starts monitoring whether or not touch to the command region of the call button specified by coordinate information included in the validation message of the call button is acquired by the user interface unit 180.

When the call button is not touched (step S134/No), the control unit 170 determines whether or not an invalidation message of the call button is received by the control signal transmission/reception unit 160 (step S148). When it is determined that the invalidation message is not received (step S148/No), the processing returns to step S134 again, where the control unit 170 continues to monitor touch to the call button. On the other hand, when it is determined that the invalidation message is received (step S148/Yes), the control unit 170 invalidates the call button (step S150). The processing then returns to step S108 again.

When the call button is touched (step S134/Yes), the control unit 170 executes a command of the call button indicated in command information included in the validation message of the call button (step S136). For example, the control unit 170 turns on the microphone 151 to validate audio input. Further, the control unit 170 performs PAUSE cancel setting (PLAY setting) of Miracast, and resumes audio data transmission to the source device 200. Still further, the control unit 170 controls the control signal transmission/reception unit 160 to transmit a coordination request message relating to the call button to the source device 200. For example, the control unit 170 transmits a message including operation information indicating that the call button is touched and a message for PLAY setting as the coordination request message. By this means, for example, wireless connection between the source device 200 and the calling party is established, so that a speech phone call is started. Therefore, for example, the screen transitions from a calling screen to the speech phone call screen, the call button is hidden, and the disconnect button is displayed. In accordance with this, the source device 200 transmits an invalidation message of the call button and a validation message of the disconnect button to the sink device 100. When the invalidation message of the call button is received by the control signal transmission/reception unit 160, the control unit 170 invalidates the call button (step S138).

Further, when the validation message of the disconnect button is received by the control signal transmission/reception unit 160, the control unit 170 validates the disconnect button (step S140). When the disconnect button is not touched (step S142/No), the processing returns to step S142 again, where the control unit 170 continues to monitor touch to the disconnect button. On the other hand, when the disconnect button is touched (step S142/Yes), the control unit 170 executes a command of the disconnect button indicated in command information included in the validation message of the disconnect button (step S144). For example, the control unit 170 turns off the microphone 151 to invalidate audio input. Further, the control unit 170 performs PAUSE setting of Miracast, and suspends audio data transmission to the source device 200. Still further, the control unit 170 controls the control signal transmission/reception unit 160 to transmit a coordination request message relating to the disconnect button to the source device 200. For example, the control unit 170 transmits a message including operation information indicating that the disconnect button is touched and a message for PAUSE setting as the coordination request message. By this means, wireless connection between the source device 200 and the calling party is disconnected, so that a speech phone call ends. Therefore, for example, the screen transitions from the speech phone call screen to the menu screen, and the disconnect button is hidden. In accordance with this, the source device 200 transmits an invalidation message of the disconnect button to the sink device 100. When the invalidation message of the disconnect button is received by the control signal transmission/reception unit 160, the control unit 170 invalidates the disconnect button (step S146).

The flow of the incoming call processing and the calling processing executed at the sink device 100 according to the present embodiment has been described above. The processing after the above-described step S108 may be repeated as necessary. The sink device 100 according to the present embodiment can directly execute a command when a command region is validated as a result of a validation message being received, and the command region is manipulated. For example, when the incoming call button, the call button and the disconnect button are touched, the sink device 100 can directly perform various kinds of processing such as ON/OFF of the microphone 151 without determination and instruction by the source device 200. Therefore, because the number of control messages transmitted/received to/from the source device 200 from when the buttons are touched until when the sink device 100 starts operation is reduced, response becomes higher, and power consumption is reduced.

Further, by establishing bidirectional Miracast connection in advance, the sink device 100 can achieve higher response than in a case where bidirectional connection is established only after a speech phone call is required. Further, the sink device 100 performs PAUSE setting while a speech phone call is not performed and performs PAUSE cancel setting only while a speech phone call is performed, so that it is possible to realize reduction of power consumption.

[4-2-2. Operation of Source Device 200 Upon Incoming Call/Calling]

Figure 9:
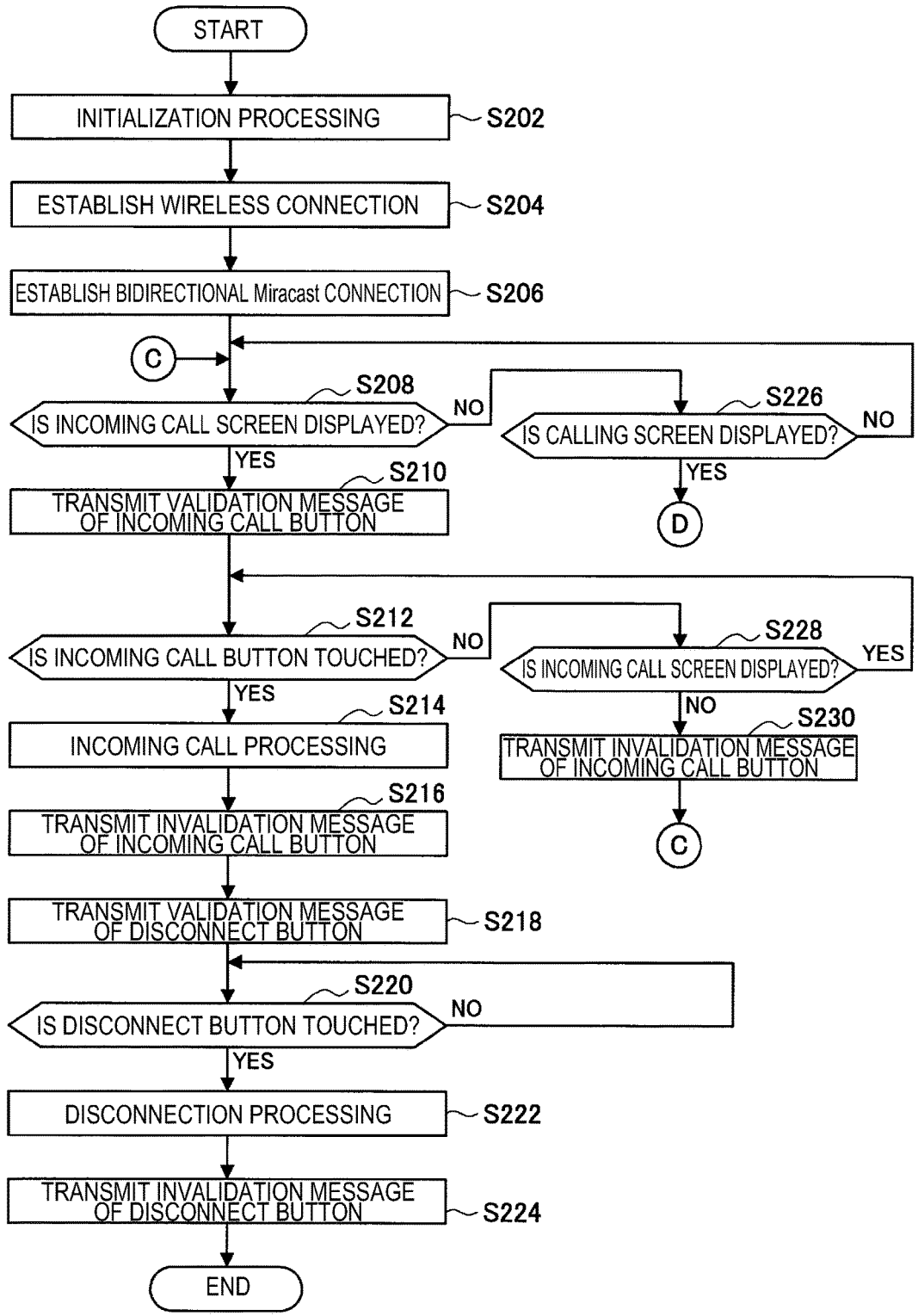
FIG. 9 is a diagram illustrating an example of flow of incoming call processing and calling processing executed by the source device according to the first embodiment.
Figure 10:
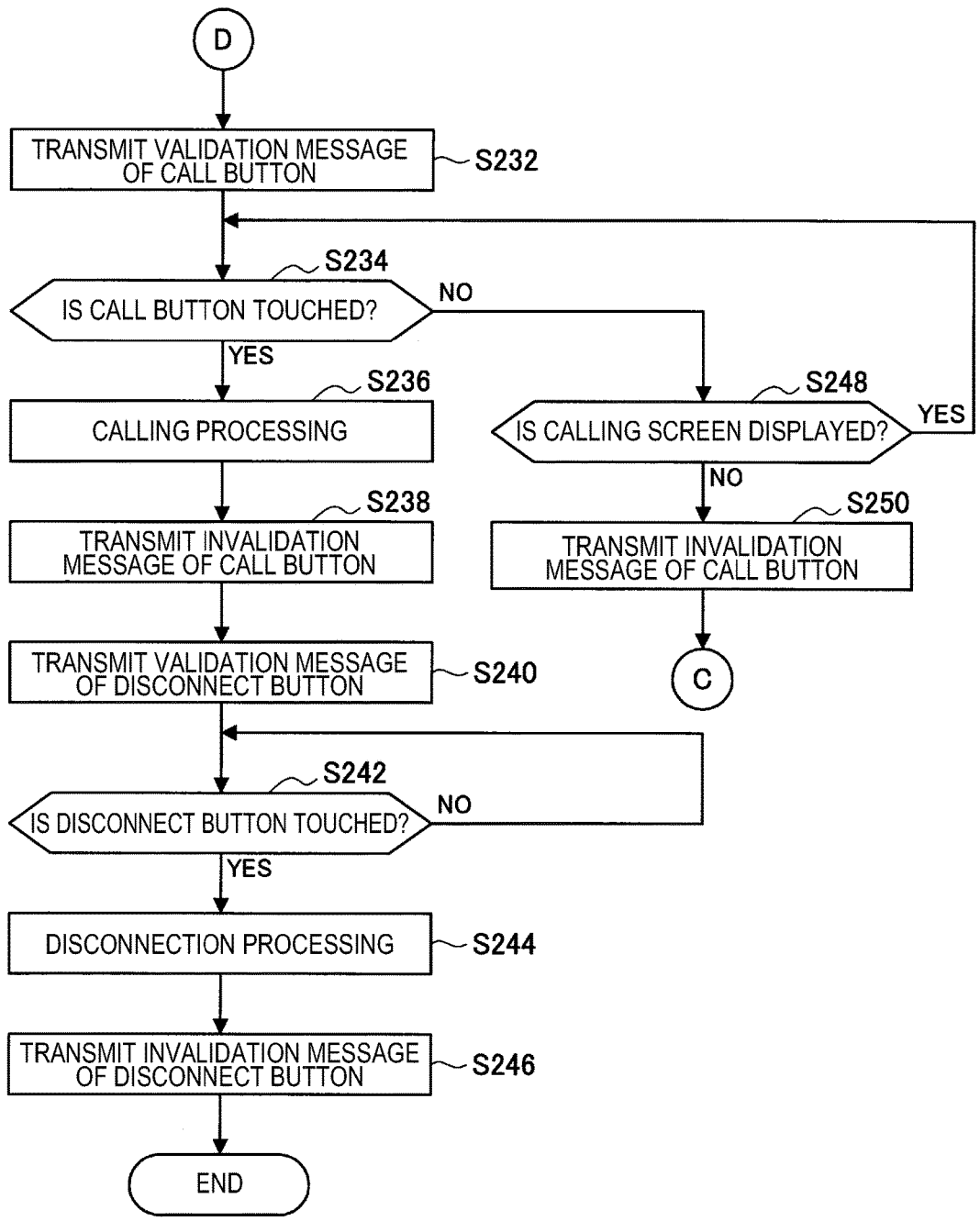
FIG. 10 is a diagram illustrating an example of flow of incoming call processing and calling processing executed by the source device according to the first embodiment.

FIG. 9 and FIG. 10 are diagrams illustrating examples of flow of incoming call processing and calling processing executed by the source device 200 according to the present embodiment.

Referring to FIG. 9, first, the control unit 270 of the source device 200 performs initialization processing and preparation processing of each apparatus within the source device 200 (step S202). The control unit 270 then controls the wireless communication unit 210 to establish wireless connection with the wireless communication unit 110 of the sink device 100 (step S204). Subsequently, the wireless communication unit 210 establishes bidirectional Miracast connection with the sink device 100 (step S206). Specifically, first, the control unit 270 controls the control signal transmission/reception unit 260 to perform various kinds of negotiation by transmitting/receiving a control message to/from the control signal transmission/reception unit 160 of the sink device 100. The control unit 270 then controls the stream transmission/reception unit 220 and the compression/decompression unit 230 to convert content acquired by the content acquisition unit 240 into a radio signal and transmit the radio signal to the sink device 100 by the wireless communication unit 210. Through this processing, the source device 200 operates as the source device and can reproduce content transmitted to the sink device. Further, the control unit 270 controls the stream transmission/reception unit 220 and the compression/decompression unit 230 to decode content data from the radio signal received from the sink device 100 by the wireless communication unit 210 and output the content data from the content reproduction unit 250. Through this processing, the source device 200 operates as the sink device and can reproduce content received from the sink device 100 which functions as the source device. Such bidirectional connection, for example, enables speech of the other party to be reproduced using the speaker 152 and user speech acquired by the microphone 151 to be transmitted to the other party of a phone call when a speech phone call such as a phone call is performed. Here, because reception of microphone speech from the sink device 100 is not required while a speech phone call is not performed, it is preferable that the control unit 270 performs PAUSE setting of Miracast and makes reception of audio data from the sink device 100 temporarily pause.

Subsequently, the control unit 270 determines whether or not the incoming call screen is displayed (step S208). The incoming call screen is displayed, for example, from when a phone call is made from outside using a public wireless communication network until when a speech phone call is started. When it is determined that the incoming call screen is not displayed (step S208/No), the control unit 270 determines whether or not the calling screen is displayed (step S226). The calling screen is, for example, a screen for selecting the other party of a phone call or a screen for inputting a phone number when a phone call is made using a public wireless communication network, and a screen which enables a phone call to be made through touch to the call button. When it is determined that neither of the screens is displayed (step S226/No), the processing returns to step S208 again.

When there is an incoming call from outside and the incoming call screen is displayed (step S208/Yes), the control unit 270 controls the control signal transmission/reception unit 260 to transmit a validation message of the incoming call button to the sink device 100 (step S210). By this means, at the sink device 100, the incoming call button is validated. Subsequently, the control unit 270 determines whether or not the incoming call button is touched at the sink device 100 (step S212). The control unit 270 determines that the incoming call button is touched when a coordination request message resulting from touch to the incoming call button is received from the sink device 100.

When it is determined that the incoming call button is not touched (step S212/No), the control unit 270 determines whether or not the incoming call screen continues to be displayed (step S228). When it is determined that the incoming call screen continues to be displayed (step S228/Yes), the processing returns to step S212 again, where the control unit 270 repeats determination as to whether or not the incoming call button is touched. On the other hand, when it is determined that display of the incoming call screen ends (step S228/No), the control unit 270 controls the control signal transmission/reception unit 260 to transmit an invalidation message of the incoming call button to the sink device 100 (step S230). By this means, at the sink device 100, the incoming call button is invalidated. Then, the processing returns to step S208 again.

When it is determined that the incoming call button is touched (step S212/Yes), the control unit 270 performs incoming call processing (step S214). For example, the control unit 270 controls the wireless communication unit 210 to establish wireless connection with an incoming call party based on a coordination request message and starts a speech phone call between the source device 200 and the incoming call party. Further, the control unit 270 performs PAUSE cancel setting based on a message for PLAY setting of Miracast and resumes audio data reception from the sink device 100. By this means, the user speech acquired from the microphone 151 of the sink device 100 can be transmitted to the other party of the phone call. When a speech phone call is started, for example, the screen transitions from the incoming call screen to the speech phone call screen, and the incoming call button is hidden, and the disconnect button is displayed. In accordance with this, the control unit 270 controls the control signal transmission/reception unit 260 to transmit an invalidation message of the incoming call button and a validation message of the disconnect button to the sink device 100 (step S216, S218). By this means, at the sink device 100, the incoming call button is invalidated, and the disconnect button is validated.

Subsequently, the control unit 270 determines whether or not the disconnect button is touched at the sink device 100 (step S220). The control unit 270 determines that the disconnect button is touched when a coordination request message resulting from touch to the disconnect button is received from the sink device 100. When the disconnect button is not touched (step S220/No), the processing returns to step S220 again, where the control unit 270 repeats determination as to whether or not the disconnect button is touched. On the other hand, when it is determined that the disconnect button is touched (step S220/Yes), the control unit 270 performs disconnection processing (step S222). For example, the control unit 270 controls the wireless communication unit 210 to disconnect wireless connection with the incoming call party based on the coordination request message. Further, the control unit 270 performs PAUSE setting based on a message for PAUSE setting of Miracast, and suspends audio data reception from the sink device 100. When a speech phone call ends in this manner, for example, the screen transitions from the speech phone call screen to the menu screen, and the disconnect button is hidden. In accordance with this, the control unit 270 controls the control signal transmission/reception unit 260 to transmit an invalidation message of the disconnect button to the sink device 100 (step S224). By this means, at the sink device 100, the disconnect button is invalidated.

When the calling screen is displayed after Miracast connection is established (step S206) (step S226/Yes), referring to FIG. 10, the control unit 270 controls the control signal transmission/reception unit 260 to transmit a validation message of the call button to the sink device 100 (step S232). By this means, at the sink device 100, the call button is validated. Subsequently, the control unit 270 determines whether or not the call button is touched at the sink device 100 (step S234). The control unit 270 determines that the call button is touched when a coordination request message resulting from touch to the call button is received from the sink device 100.

When it is determined that the call button is not touched (step S234/No), the control unit 270 determines whether or not the calling screen continues to be displayed (step S248). When it is determined that the calling screen continues to be displayed (step S248/Yes), the processing returns to step S234 again, where the control unit 270 repeats determination as to whether or not the call button is touched. On the other hand, when display of the calling screen ends by, for example, the user cancelling calling (step S248/No), the control unit 270 controls the control signal transmission/ reception unit 260 to transmit an invalidation message of the call button to the sink device 100 (step S250). By this means, at the sink device 100, the call button is invalidated. The processing then returns to step S208 again.

When it is determined that the call button is touched (step S234/Yes), the control unit 270 performs calling processing (step S236). For example, the control unit 270 controls the wireless communication unit 210 to establish wireless connection with the calling party based on a coordination request message and starts a speech phone call between the source device 200 and the calling party. Further, the control unit 270 performs PAUSE cancel processing based on a message for PLAY setting of Miracast and resumes audio data reception from the sink device 100. By this means, the user speech acquired from the microphone 151 of the sink device 100 can be transmitted to the other party of the phone call. When a speech phone call is started, for example, the screen transitions from the calling screen to the speech phone call screen, in which the call button is hidden and the disconnect button is displayed. In accordance with this, the control unit 270 controls the control signal transmission/ reception unit 260 to transmit an invalidation message of the call button and a validation message of the disconnect button to the sink device 100 (step S238, S240). By this means, at the sink device 100, the call button is invalidated, and the disconnect button is validated.

Subsequently, the control unit 270 determines whether or not the disconnect button is touched at the sink device 100 (step S242). The control unit 270 determines that the disconnect button is touched when a coordination request message resulting from touch to the disconnect button is received from the sink device 100. When the disconnect button is not touched (step S242/No), the processing returns to step S220 again, where the control unit 270 repeats determination as to whether or not the disconnect button is touched. On the other hand, when it is determined that the disconnect button is touched (step S242/Yes), the control unit 270 performs disconnection processing (step S244). For example, the control unit 270 controls the wireless communication unit 210 to disconnect wireless connection with the calling party. Further, the control unit 270 performs PAUSE setting based on a message for PAUSE setting of Miracast and suspends audio data reception from the sink device 100. When a speech phone call ends in this manner, for example, the screen transitions from the speech phone call screen to the menu screen, and the disconnect button is hidden. In accordance with this, the control unit 270 controls the control signal transmission/reception unit 260 to transmit an invalidation message of the disconnect button to the sink device 100 (step S246). By this means, at the sink device 100, the disconnect button is invalidated.

The flow of the incoming call processing and the calling processing executed by the source device 200 according to the present embodiment has been described above. The processing after the above-described step S208 may be repeated as necessary. The source device 200 according to the present embodiment enables a command to be directly executed at the sink device 100 by transmitting a validation message. Therefore, because the number of control messages transmitted/received to/from the sink device 100 from when user operation is acquired at the sink device 100 until when the sink device 100 starts operation, response becomes higher, and power consumption is reduced.

[4-3. Flow of Message Transmission/Reception]

Subsequently, correspondence relationship between control messages transmitted/received at the sink device 100 and the source device 200 and operation of each apparatus, which have been described above with reference to FIG. 7 to FIG. 10 will be described with reference to FIG. 11 to FIG. 17.

(Calling Processing)

Figure 11:
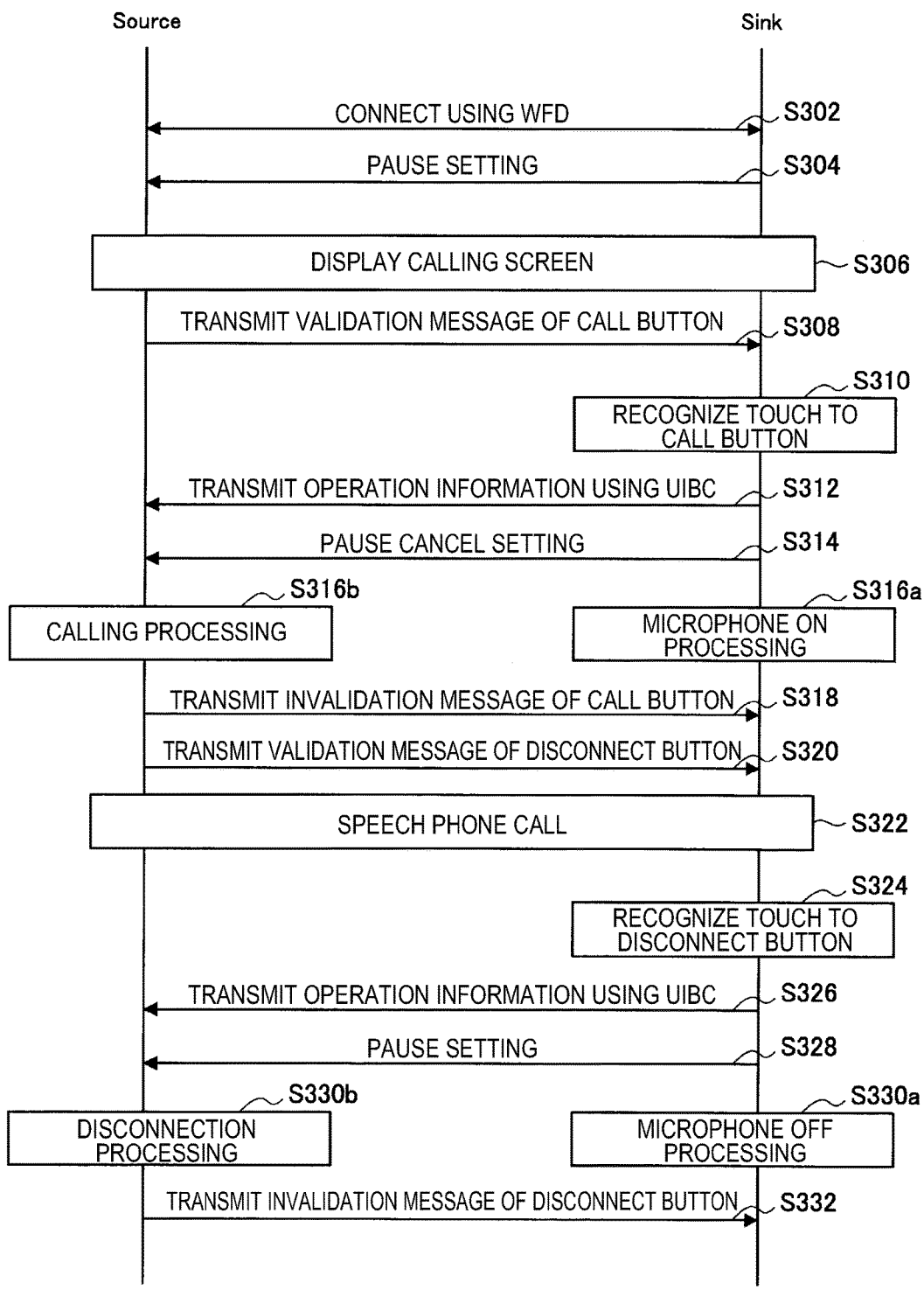
FIG. 11 is a sequence diagram illustrating an example of flow of calling processing executed by a communication system according to the first embodiment.

FIG. 11 is a sequence diagram illustrating an example of flow of calling processing executed in the communication system 1 according to the present embodiment.

As illustrated in FIG. 11, first, the sink device 100 and the source device 200 establish bidirectional Miracast connection using Wi-Fi direct (WFD) (step S302). At this time, the sink device 100 performs PAUSE setting of Miracast regarding transmission of audio data acquired by the microphone 151 of the sink device 100 and suspends transmission of audio data from the sink device 100 to the source device 200 (step S304).

When the calling screen is displayed at the sink device 100 and the source device 200 (step S306), the source device 200 transmits a validation message of the call button to the sink device 100 (step S308). By this means, at the sink device 100, the call button is validated. Here, an example of the calling screen and the call button will be described with reference to FIG. 12.

FIG. 12 is a diagram illustrating an example of the calling screen and the call button. The left part of FIG. 12 illustrates a screen in which a phone number is to be input, that is, a calling screen which enables a call to be made to the input phone number when an OffHook button 300a is touched. The right part of FIG. 12 illustrates a screen on which call history is displayed, that is, a calling screen which enables a call to be made to a phone number indicated in the call history when call history 300b or an OffHook button 300c is touched. In FIG. 12, the OffHook buttons 300a, 300b and the call history 300b function as the call button. As illustrated in the right part of FIG. 12, there may be a plurality of command regions.

When touch to the call button is recognized at the sink device 100 (step S310), the sink device 100 transmits a coordination request message to the source device 200. For example, the sink device 100 transmits operation information indicating that the call button is touched using UIBC (step S312). Further, the sink device 100 performs PAUSE cancel setting for transmission of audio data acquired by the microphone 151 of the sink device 100 and resumes audio data transmission to the source device 200 (step S314). The sink device 100 then turns on the microphone 151 to validate audio input in response to recognition of touch to the call button (step S316a). Meanwhile, the source device 200 performs calling processing based on the received coordination request message (step S316b). The source device 200 then transmits an invalidation message of the call button and a validation message of the disconnect button to the sink device 100 as the call button is hidden and the disconnect button is displayed as a result of transition from the calling screen to the speech phone call screen (step S318, S320). By this means, a speech phone call between the sink device 100 and the source device 200, and the calling party is made (step S322). Here, an example of the speech phone call screen and the disconnect button will be described with reference to FIG. 13.

Figure 13:
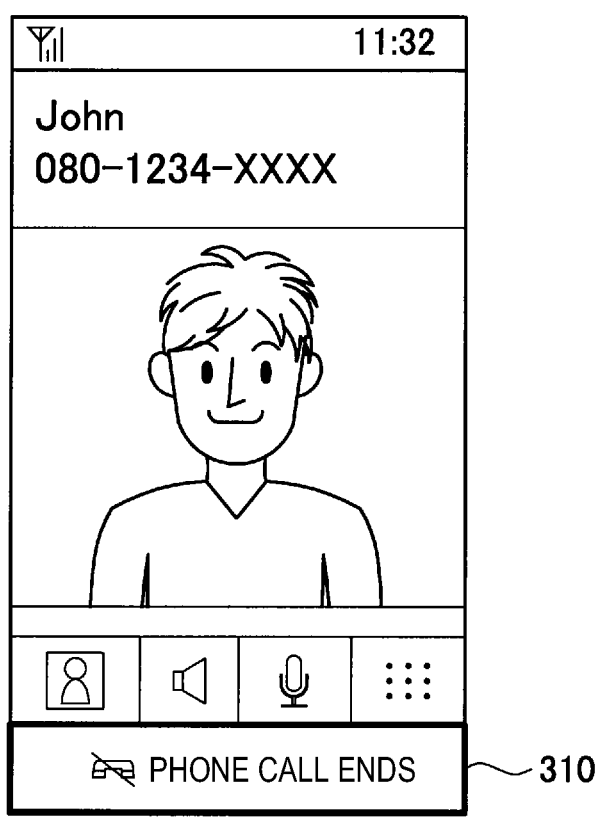
FIG. 13 is a diagram illustrating an example of a speech phone call screen and a disconnect button according to an embodiment of the present disclosure.

FIG. 13 is a diagram illustrating an example of the speech phone call screen and the disconnect button. In the speech phone call screen illustrated in FIG. 13, the party with whom the user is making a speech phone call is displayed, and the disconnect button 310 is displayed. When the disconnect button 310 is touched, the speech phone call ends.

When touch to the disconnect button is recognized at the sink device 100 (step S324), the sink device 100 transmits a coordination request message to the source device 200. For example, the sink device 100 transmits operation information indicating that the disconnect button is touched using UIBC (step S326). Further, the sink device 100 performs PAUSE setting for transmission of audio data acquired by the microphone 151 of the sink device 100 and suspends audio data transmission to the source device 200 (step S328). Subsequently, the sink device 100 turns off the microphone 151 to invalidate audio input in response to recognition of touch to the disconnect button (step S330a). Meanwhile, the source device 200 performs disconnection processing based on the received coordination request message (step S330b). The source device 200 then transmits an invalidation message of the disconnect button to the sink device 100 as the speech phone call screen ends and the disconnect button is hidden (step S332). By this means, a speech phone call between the sink device 100 and the source device 200, and the calling party ends.

While an example in which a speech phone call is disconnected by the sink device 100 has been described with FIG. 11, there can be also a case where a speech phone call is disconnected at the other party. Processing in such a case will be described with reference to FIG. 14.

Figure 14:
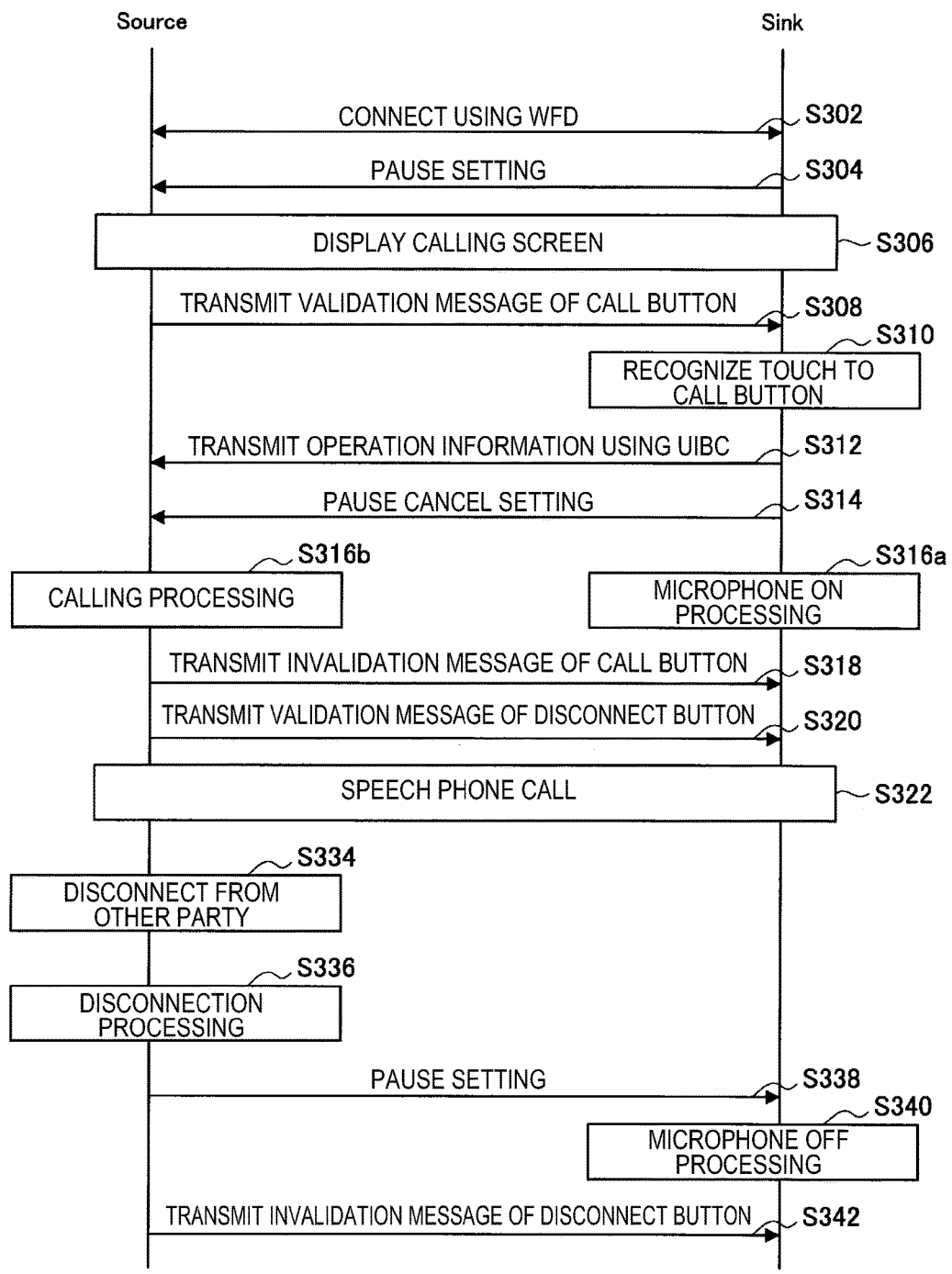
FIG. 14 is a sequence diagram illustrating an example of flow of calling processing executed in the communication system according to the first embodiment.

FIG. 14 is a sequence diagram illustrating an example of flow of calling processing executed in the communication system 1 according to the present embodiment. Because processing in steps S302 to S322 in FIG. 14 is as described above with reference to FIG. 11, explanation thereof will be omitted here.

As illustrated in FIG. 14, when a speech phone call is disconnected at the other party (step S334), the source device 200 performs disconnection processing (step S336). The source device 200 then performs PAUSE setting for reception of audio data acquired by the microphone 151 of the sink device 100 and suspends audio data reception from the sink device 100 (step S338). The sink device 100 then turns off the microphone 151 to invalidate audio input by receiving PAUSE (step S340). The source device 200 then transmits an invalidation message of the disconnect button to the sink device 100 as the speech phone call ends and the disconnect button is hidden (step S342). By this means, a speech phone call between the sink device 100 and the source device 200, and the calling party ends.

The correspondence relationship between the control messages transmitted/received for calling processing and operation of each apparatus has been described above. Subsequently, correspondence relationship between control messages transmitted/received for incoming call processing and operation of each apparatus will be described with reference to FIG. 15 to FIG. 17.

(Incoming Call Processing)

Figure 15:
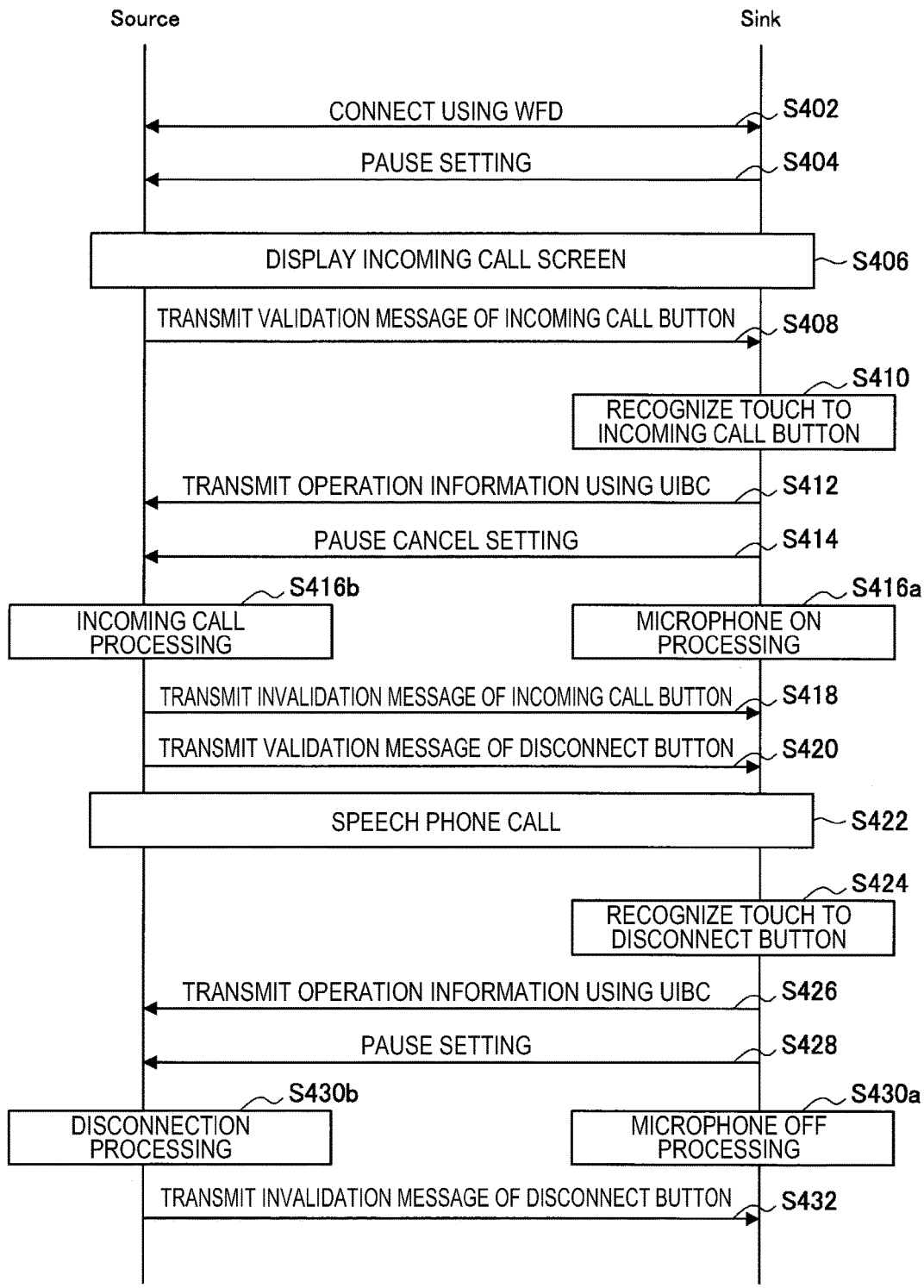
FIG. 15 is a sequence diagram illustrating an example of flow of incoming call processing executed in the communication system according to the first embodiment.

FIG. 15 is a sequence diagram illustrating an example of flow of incoming call processing executed in the communication system 1 according to the present embodiment.

As illustrated in FIG. 15, first, the sink device 100 and the source device 200 establish bidirectional Miracast connection using WFD (step S402). At this time, the sink device 100 performs PAUSE setting of Miracast for transmission of audio data acquired by the microphone 151 of the sink device 100 and suspends audio data transmission from the sink device 100 to the source device 200 (step S404).

When an incoming call screen is displayed at the sink device 100 and the source device 200 (step S406), the source device 200 transmits a validation message of the incoming call button to the sink device 100 (step S408). By this means, the incoming call button is validated at the sink device 100. Here, an example of the incoming call screen and the incoming call button will be described with reference to FIG. 16.

Figure 16:
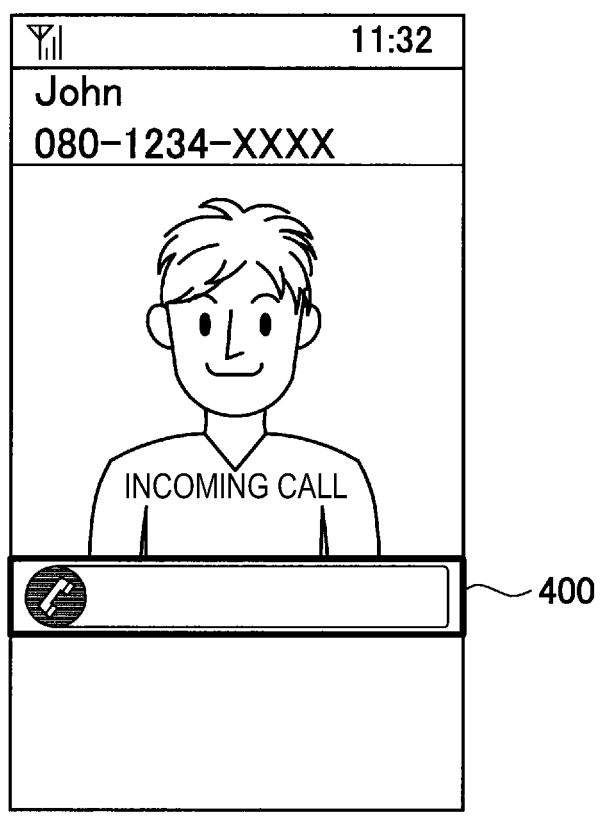
FIG. 16 is a diagram illustrating an example of an incoming call screen and an incoming call button according to an embodiment of the present disclosure.

FIG. 16 is a diagram illustrating an example of the incoming call screen and the incoming call button. As illustrated in FIG. 16, an incoming call party which is a source of a phone call is displayed, and the incoming call button 400 is displayed. In this example, when an icon at the left side of the incoming call button 400 is touched and swiped in the right direction, a speech phone call can be made with the incoming call party. It is, of course, possible to configure the incoming call button so that a speech phone call with the incoming call party can be made only through touch to the incoming call button.

When touch (swipe) to the incoming call button is recognized at the sink device 100 (step S410), the sink device 100 transmits a coordination request message to the source device 200. For example, the sink device 100 transmits operation information indicating that the incoming call button is touched using UIBC (step S412). Further, the sink device 100 performs PAUSE cancel setting for transmission of audio data acquired by the microphone 151 of the sink device 100 and resumes audio data transmission to the source device 200 (step S414). Subsequently, the sink device 100 turns on the microphone 151 to validate audio input in response to recognition of touch to the incoming call button (step S416a). Meanwhile, the source device 200 performs incoming call processing based on the received coordination request message (step S416b). The source device 200 then transmits an invalidation message of the incoming call button and a validation message of the disconnect button to the sink device 100 as the incoming call button is hidden and the disconnect button is displayed as a result of transition from the incoming call screen to the speech phone call screen (step S418, S420). By this means, a speech phone call between the sink device 100 and the source device 200, and the incoming call party is made (step S422). A specific example of the speech phone call screen and the disconnect button is as described above with reference to, for example, FIG. 13.

When touch to the disconnect button is recognized at the sink device 100 (step S424), the sink device 100 transmits a coordination request message to the source device 200. For example, the sink device 100 transmits operation information indicating that the disconnect button is touched using UIBC (step S426). Further, the sink device 100 performs PAUSE setting for transmission of audio data acquired by the microphone 151 of the sink device 100 and suspends audio data transmission to the source device 200 (step S428). Subsequently, the sink device 100 turns off the microphone 151 to invalidate audio input in response to recognition of touch to the disconnect button (step S430a). Meanwhile, the source device 200 performs disconnection processing based on the received coordination request message (step S430b). The source device 200 then transmits an invalidation message of the disconnect button to the sink device 100 as the speech phone call screen ends and the disconnect button is hidden (step S432). By this means, a speech phone call between the sink device 100 and the source device 200, and the incoming call party ends.

While an example in which a speech phone call is disconnected by the sink device 100 has been described with FIG. 15, there is also a case where a speech phone call is disconnected at the other party. Processing in such a case will be described with reference to FIG. 17.

Figure 17:
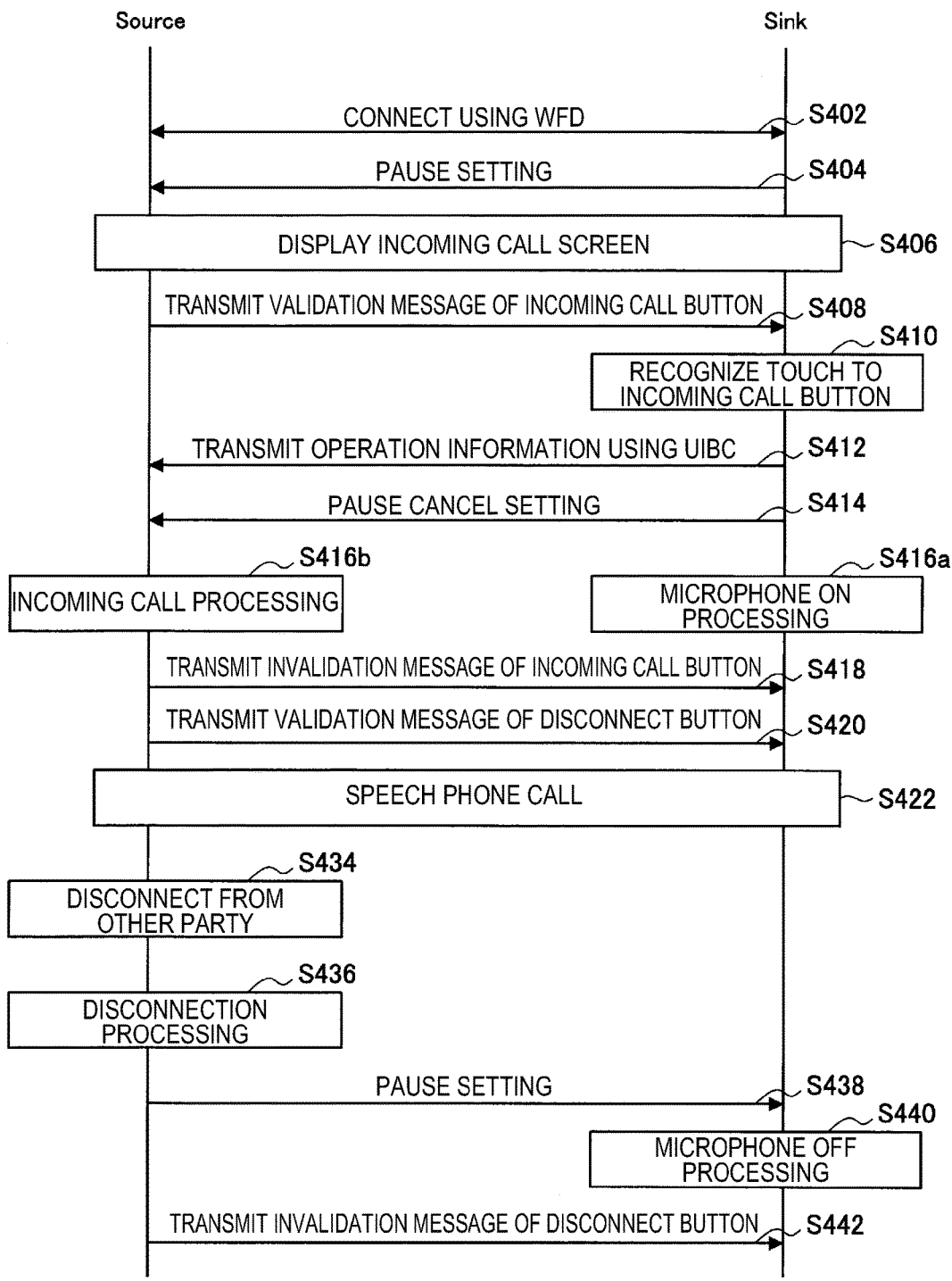
FIG. 17 is a sequence diagram illustrating an example of flow of incoming call processing executed in the communication system according to the first embodiment.

FIG. 17 is a sequence diagram illustrating an example of flow of incoming call processing executed in the communication system 1 according to the present embodiment. Because processing in step S402 to S422 in FIG. 17 is as described above with reference to FIG. 15, explanation thereof will be omitted here.

As illustrated in FIG. 17, when a speech phone call is disconnected at the other party (step S434), the source device 200 performs disconnection processing (step S436). The source device 200 then performs PAUSE setting for reception of audio data acquired by the microphone 151 of the sink device 100, and suspends audio data reception from the sink device 100 (step S438). Subsequently, the sink device 100 turns off the microphone 151 to invalidate audio input by receiving PAUSE (step S440). The source device 200 then transmits an invalidation message of the disconnect button to the sink device 100 as the speech phone call screen ends and the disconnect button is hidden (step S442). By this means, a speech phone call between the sink device 100 and the source device 200, and the incoming call party ends.

The correspondence relationship between the control messages transmitted/received in the incoming call processing and the calling processing and operation of each apparatus has been described above.

[4-4. Supplement]

Figure 18:
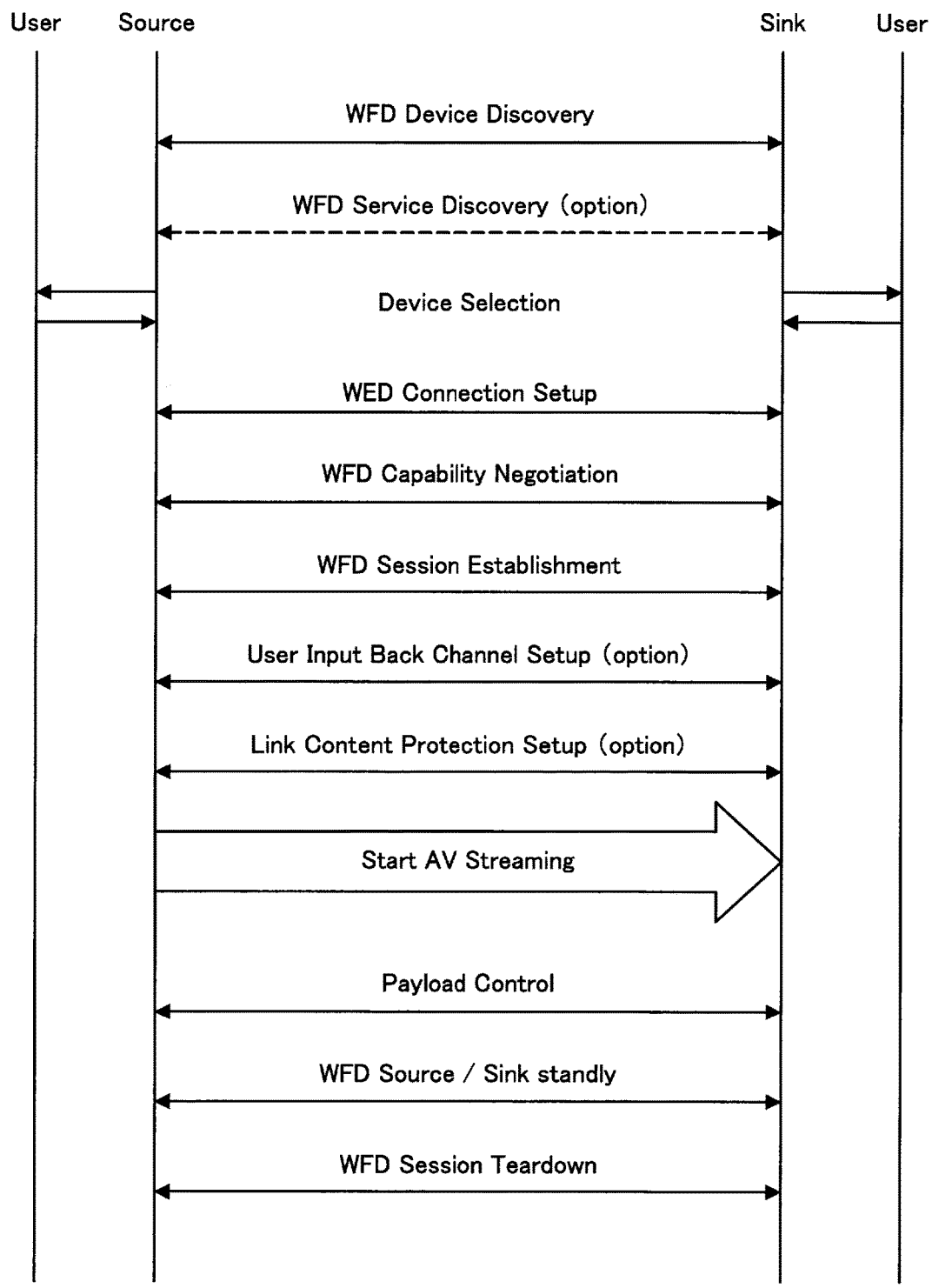
FIG. 18 is a diagram illustrating an overall message sequence executed in the communication system according to the first embodiment.
Figure 19:
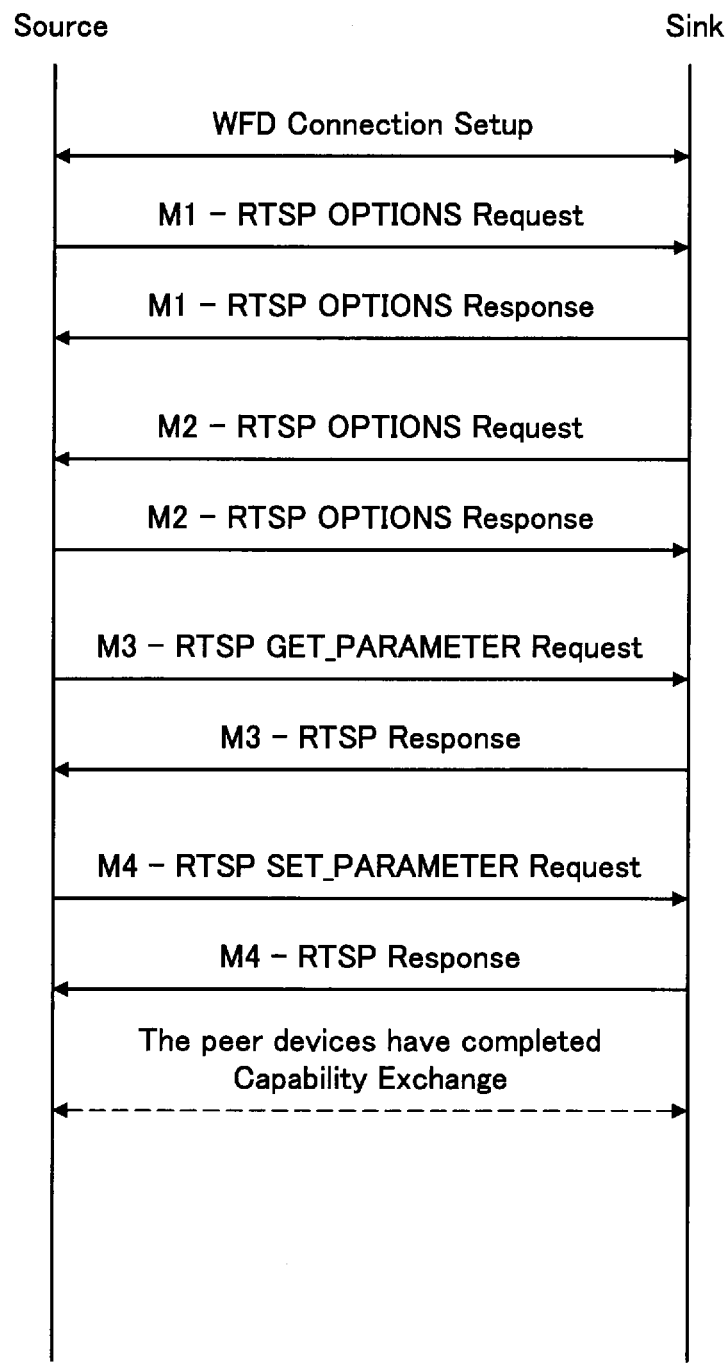
FIG. 19 is a diagram illustrating a detailed RTSP message sequence of capability negotiation procedure according to an embodiment of the present disclosure.
Figure 20:
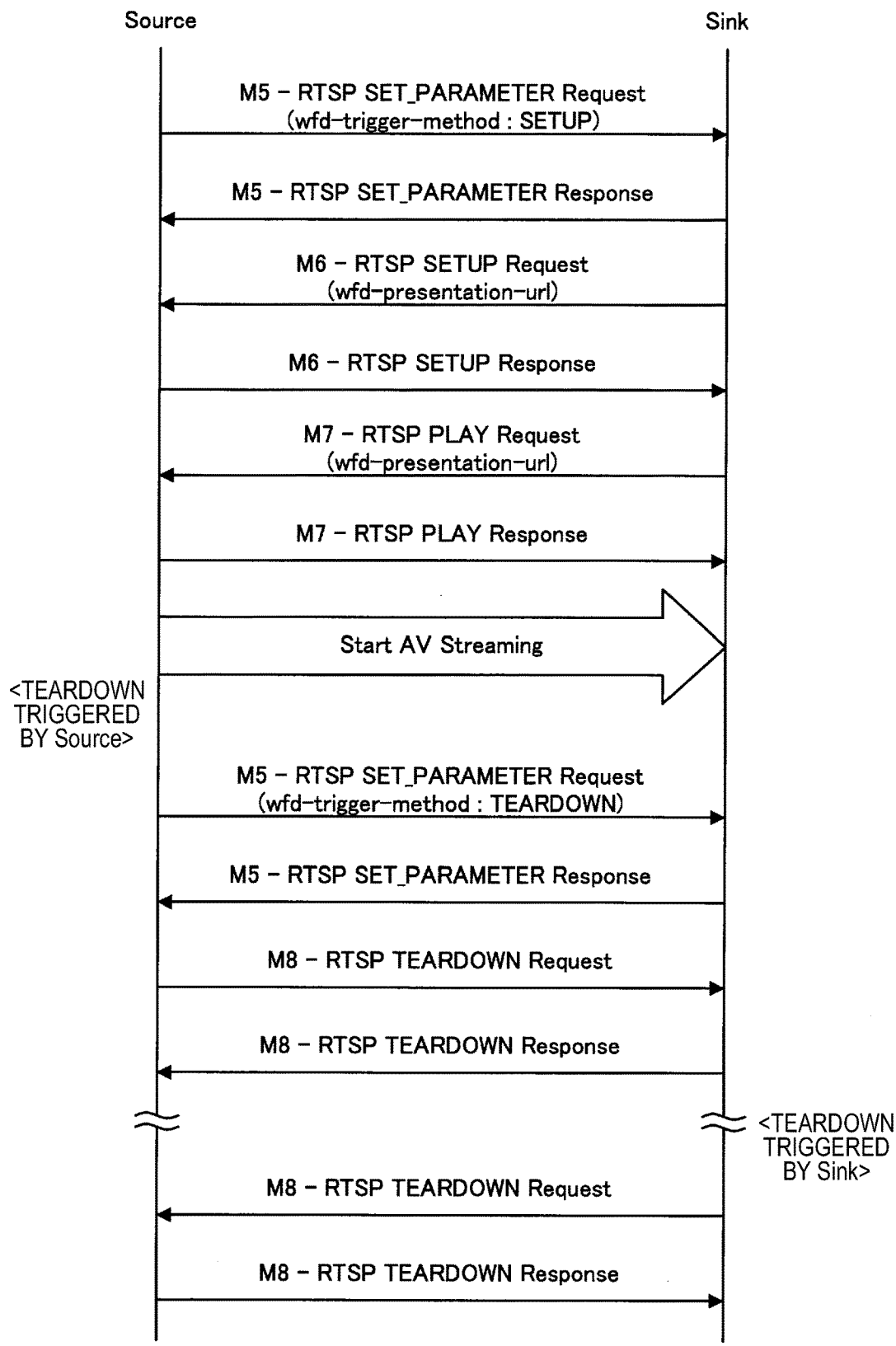
FIG. 20 is a diagram illustrating a detailed RTSP message sequence of session establishment procedure according to an embodiment of the present disclosure.
Figure 21:
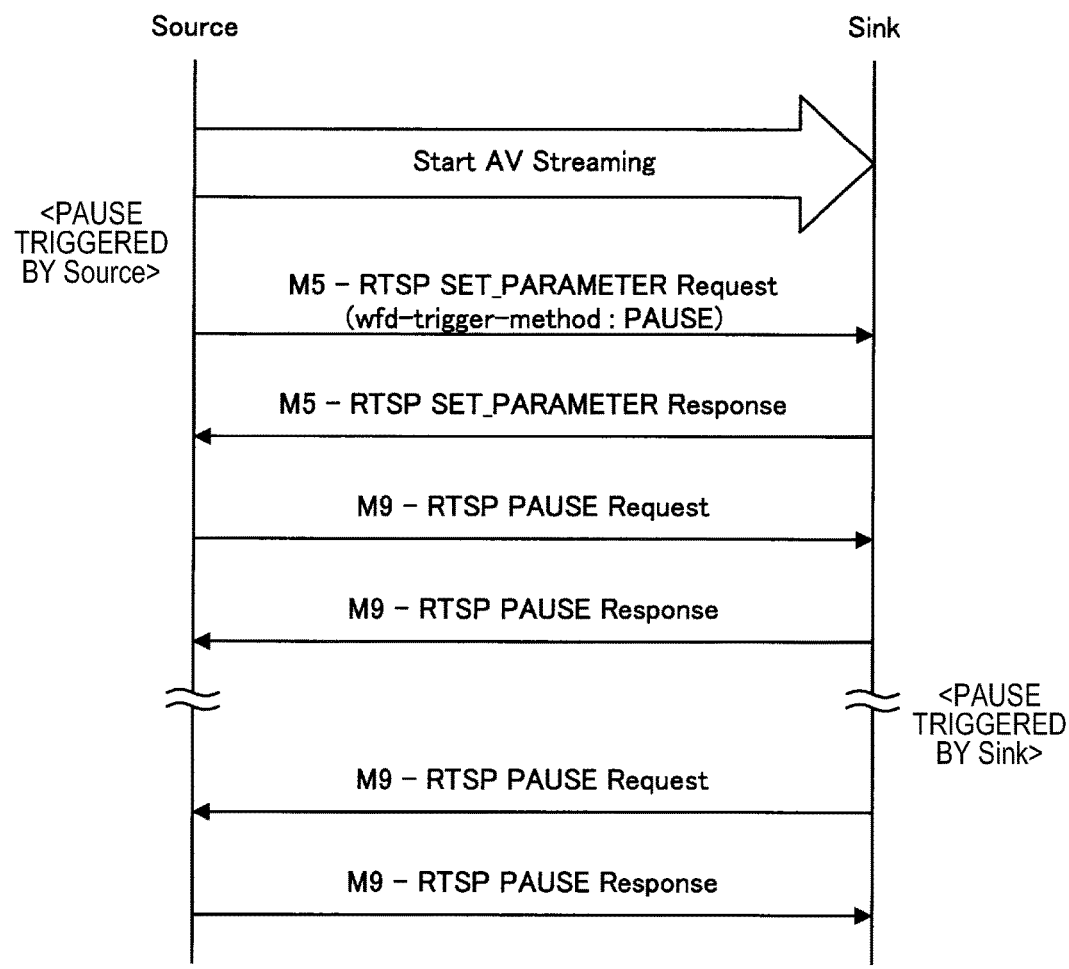
FIG. 21 is a diagram illustrating an RTSP message sequence for performing PAUSE setting of content transmission/reception according to an embodiment of the present disclosure.
Figure 22:
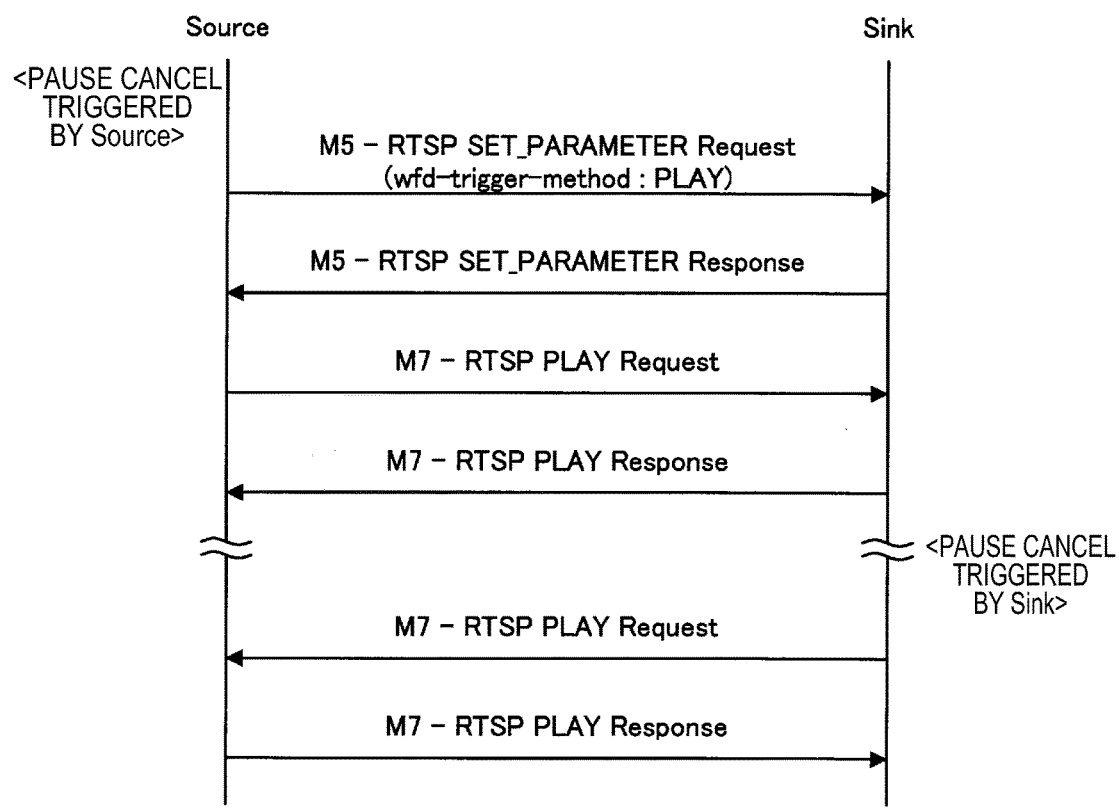
FIG. 22 is a diagram illustrating an RTSP message sequence for performing PAUSE cancel setting of content transmission/reception according to an embodiment of the present disclosure.
Figure 23:
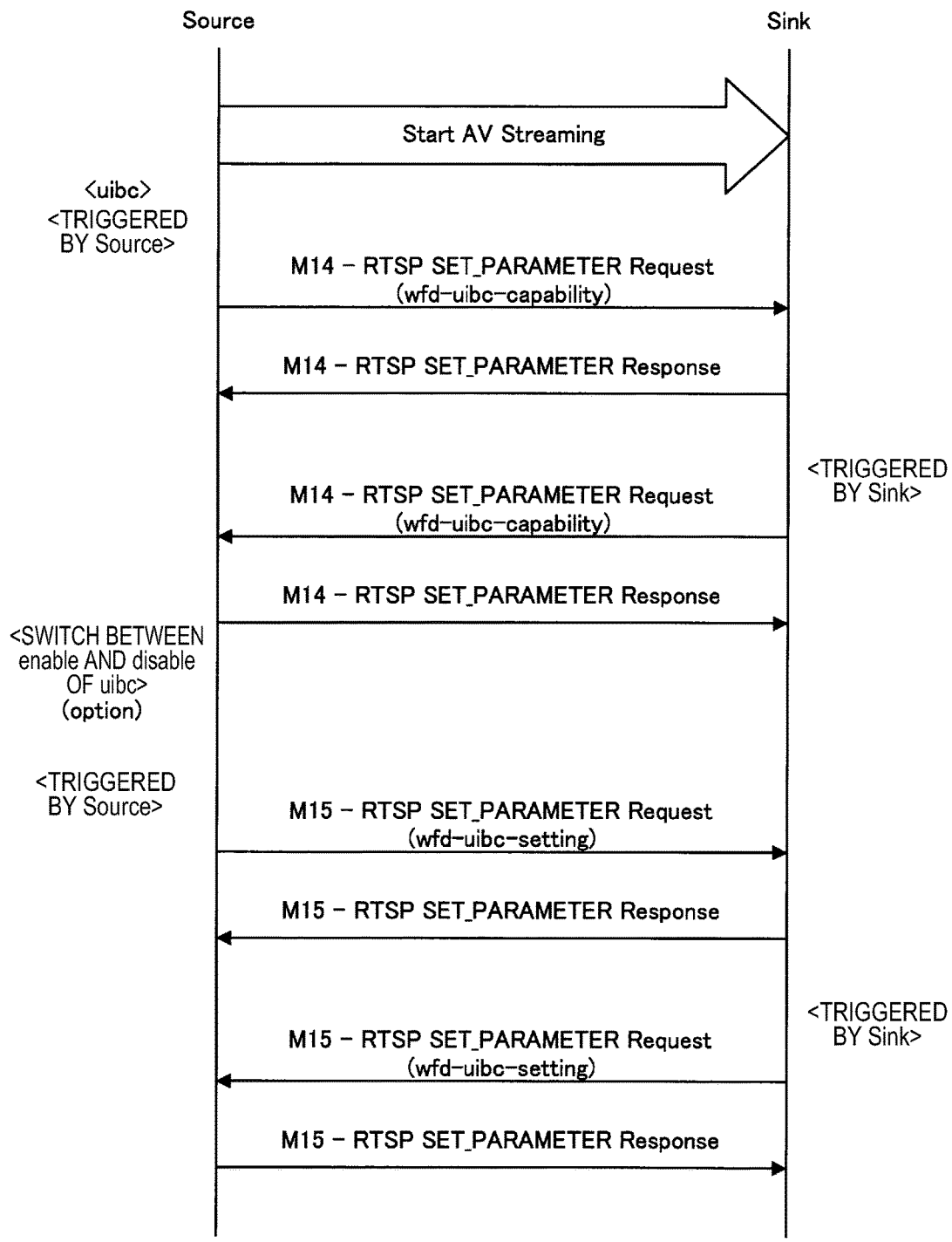
FIG. 23 is a diagram illustrating an RTSP message sequence of UIBC according to an embodiment of the present disclosure.

FIG. 18 to FIG. 23 illustrate message sequences defined in Miracast. FIG. 18 illustrates the whole image of a message sequence from when connection between the sink device (Sink) and the source device (Source) starts using WFD until when transmission of content by the source device and reproduction of content by the sink device are performed and thereafter the connection is disconnected. FIG. 19 illustrates a detailed RTSP message sequence of capability negotiation procedure (WFD capability negotiation) in FIG. 18. Further, FIG. 20 illustrates a detailed message sequence of session establishment procedure (WFD session establishment) in FIG. 18. FIG. 21 illustrates an RTSP message sequence for performing PAUSE setting of content transmission. FIG. 22 illustrates an RTSP message sequence for performing PAUSE cancel setting (PLAY setting) of content transmission/reception. FIG. 23 illustrates an RTSP message sequence of UIBC. Note that because these message sequences are as defined in specifications of the Wi-Fi display described in the above-described Non-Patent Literature 1, detailed description regarding individual messages will be omitted.

5. Second Embodiment

The present embodiment is an embodiment in which the sink device 100 performs various kinds of processing under control of the source device 200 without using a behavior setting message. Operation processing according to the present embodiment will be described below with reference to FIG. 24 to FIG. 27.

(Calling Processing)

Figure 24:
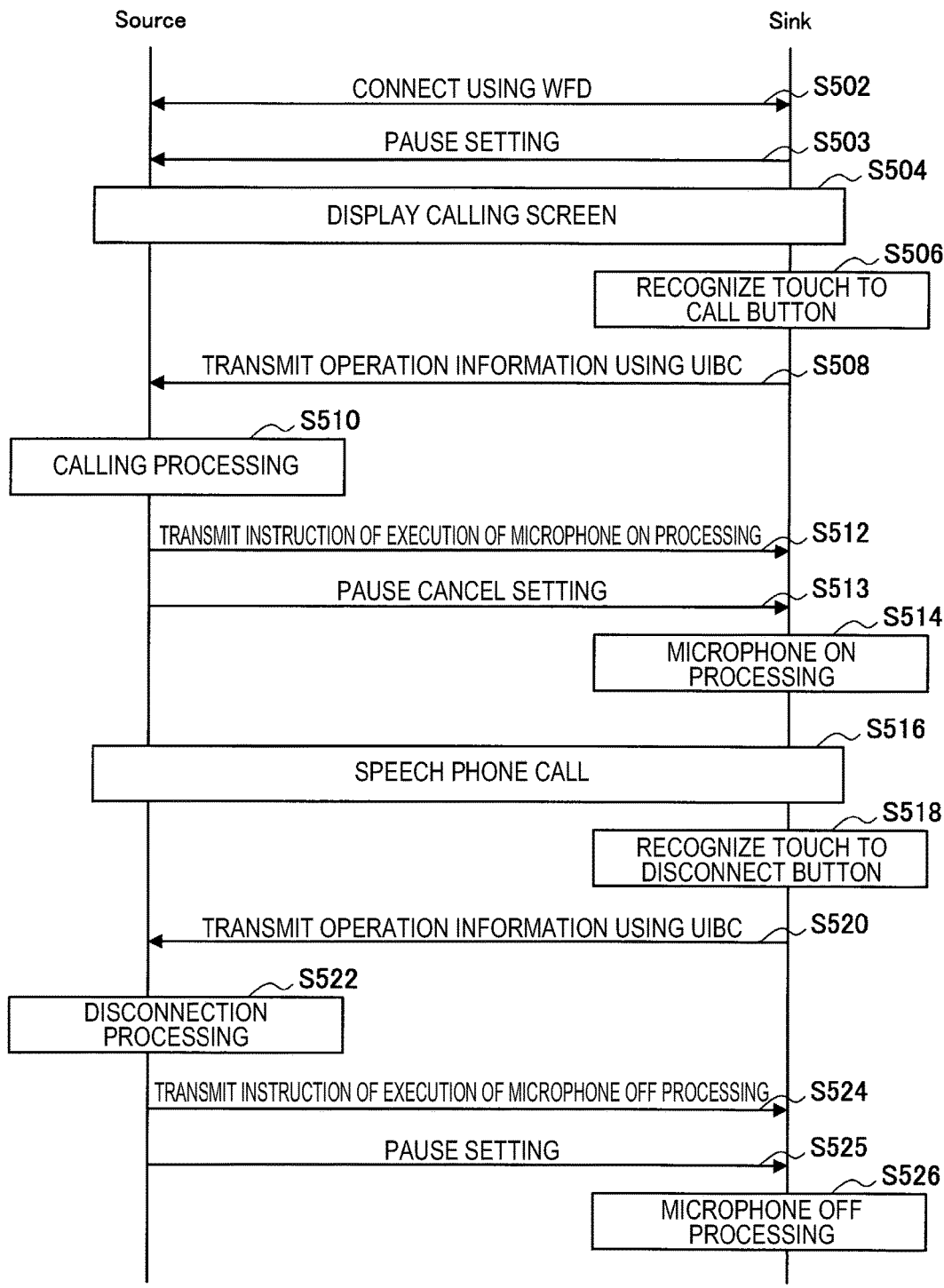
FIG. 24 is a sequence diagram illustrating an example of flow of calling processing executed in a communication system according to a second embodiment.

FIG. 24 is a sequence diagram illustrating an example of flow of calling processing executed in the communication system 1 according to the present embodiment.

As illustrated in FIG. 24, first, the sink device 100 and the source device 200 establish bidirectional Miracast connection using WFD (step S502). At this time, the sink device 100 performs PAUSE setting of Miracast for transmission of audio data acquired by the microphone 151 of the sink device 100 and suspends audio data transmission from the sink device 100 to the source device 200 (step S503). Note that the PAUSE setting may be performed from the source device 200. When the calling screen is displayed (step S504) and touch to the call button is recognized at the sink device 100 (step S506), the sink device 100 transmits operation information indicating that the call button is touched to the source device 200 as a coordination request message using UIBC (step S508). Subsequently, the source device 200 recognizes that the call button is touched at the sink device 100 based on the coordination request message and performs calling processing (step S510). The source device 200 then transmits a control message instructing execution of microphone ON processing to the sink device 100 (step S512). Further, the source device 200 performs PAUSE cancel setting for reception of audio data acquired by the microphone 151 of the sink device 100 and resumes audio data reception from the sink device 100 (step S513). Subsequently, the sink device 100 turns on the microphone 151 to validate audio input according to the received control message (step S514). By this means, a speech phone call between the sink device 100 and the source device 200, and the calling party is made (step S516).

When touch to the disconnect button is recognized at the sink device 100 (step S518), the sink device 100 transmits operation information indicating that the disconnect button is touched to the source device 200 as a coordination request message using UIBC (step S520). Subsequently, the source device 200 recognizes that the disconnect button is touched at the sink device 100 based on the coordination request message and performs disconnection processing (step S522). The source device 200 then transmits a control message instructing execution of microphone OFF processing to the sink device 100 (step S524). Further, the source device 200 performs PAUSE setting for reception of audio data acquired by the microphone 151 of the sink device 100 and suspends audio data reception from the sink device 100 (step S525). The sink device 100 then turns off the microphone 151 to invalidate audio input according to the received control message (step S526). By this means, a speech phone call between the sink device 100 and the source device 200, and the calling party ends. Note that it is also possible to merge a control message instructing execution of microphone ON/OFF processing with PAUSE setting/cancel so that when PAUSE setting is performed, the sink device 100 performs microphone OFF processing, while when PAUSE cancel is performed, the sink device 100 performs microphone ON processing.

While an example has been described with FIG. 24 where a speech phone call is disconnected by the sink device 100, there is also a case where a speech phone call is disconnected at the other party. Processing in such a case will be described with reference to FIG. 25.

Figure 25:
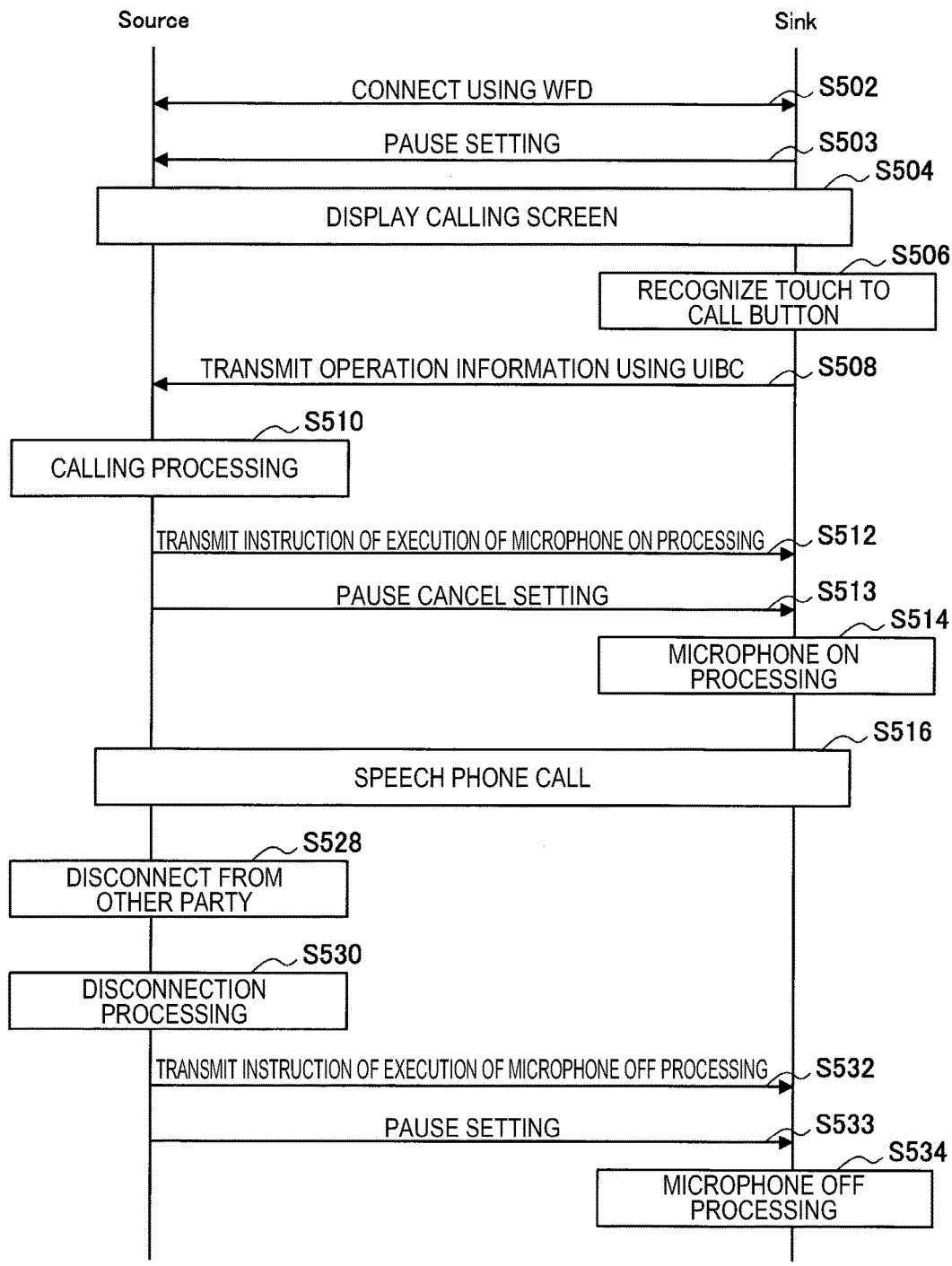
FIG. 25 is a sequence diagram illustrating an example of flow of calling processing executed in a communication system according to the second embodiment.

FIG. 25 is a sequence diagram illustrating an example of flow of calling processing executed in the communication system 1 according to the present embodiment. Because processing in step S502 to S516 in FIG. 25 is as described above with reference to FIG. 24, explanation thereof will be omitted here.

As illustrated in FIG. 25, when a speech phone call is disconnected at the other party (step S528), the source device 200 performs disconnection processing (step S530). The source device 200 then transmits a control message instructing execution of microphone OFF processing to the sink device 100 (step S532). Further, the source device 200 performs PAUSE setting for reception of audio data acquired by the microphone 151 of the sink device 100 and suspends audio data reception from the sink device 100 (step S533). The sink device 100 then turns off the microphone 151 to invalidate audio input according to the received control message (step S534). By this means, a speech phone call between the sink device 100 and the source device 200, and the calling party ends. Note that it is also possible to merge a control message instructing execution of microphone ON/OFF processing with PAUSE setting/cancel so that when PAUSE setting is performed, the sink device 100 performs microphone OFF processing, while when PAUSE cancel is performed, the sink device 100 performs microphone ON processing.

An example of the flow of the calling processing according to the present embodiment has been described above. Subsequently, an example of flow of incoming call processing according to the present embodiment will be described with reference to FIG. 26 to FIG. 27.

(Incoming Call Processing)

Figure 26:
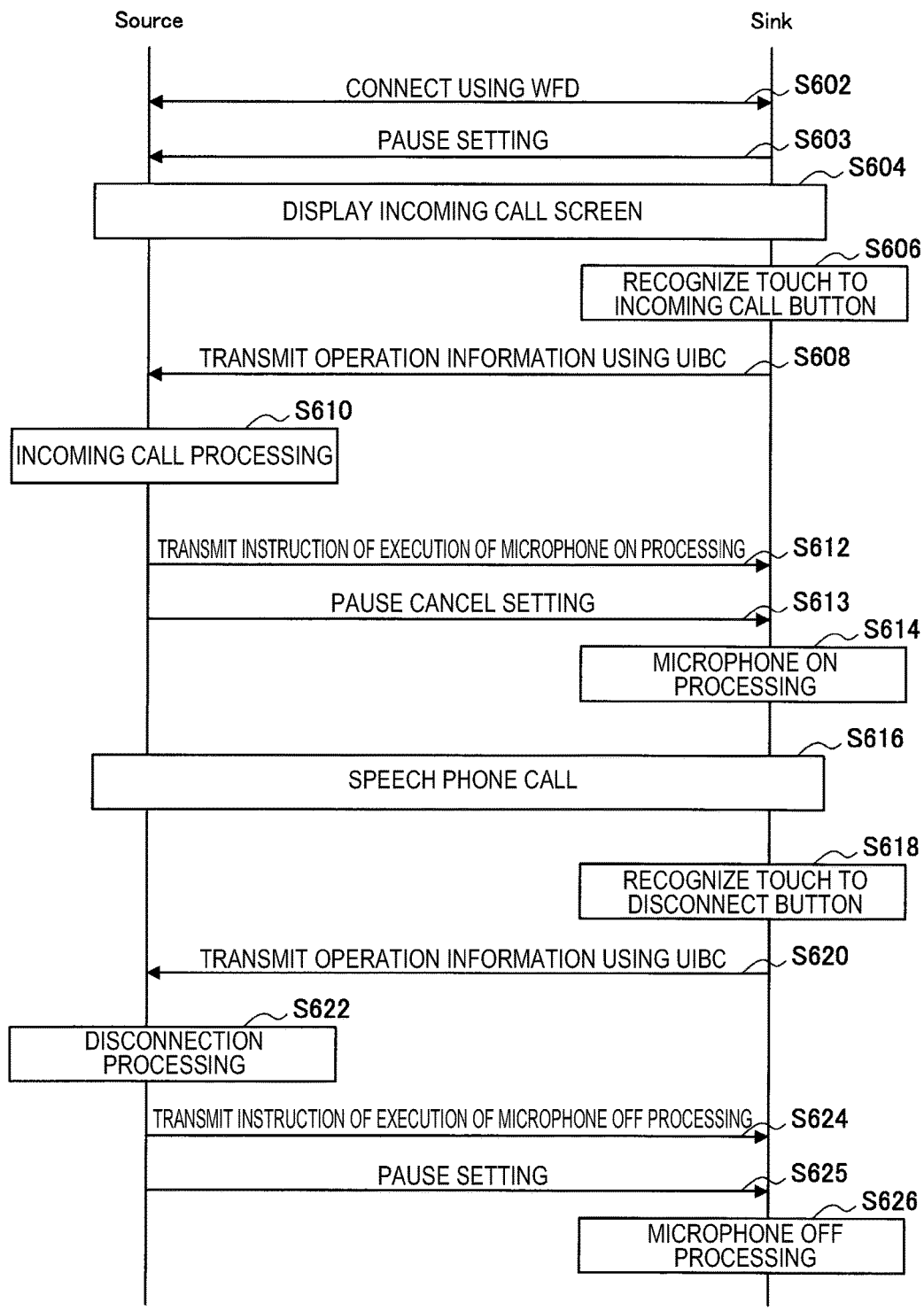
FIG. 26 is a sequence diagram illustrating an example of flow of incoming call processing executed in the communication system according to the second embodiment.

FIG. 26 is a sequence diagram illustrating an example of flow of incoming call processing executed in the communication system 1 according to the present embodiment.

As illustrated in FIG. 26, first, the sink device 100 and the source device 200 establish bidirectional Miracast connection using WFD (step S602). At this time, the sink device 100 performs PAUSE setting of Miracast for transmission of audio data acquired by the microphone 151 of the sink device 100 and suspends transmission of audio data from the sink device 100 to the source device 200 (step S603). Note that the PAUSE setting may be performed from the source device 200. When the incoming call screen is displayed (step S604), and touch to the incoming call button is recognized at the sink device 100 (step S606), the sink device 100 transmits operation information indicating that the incoming call button is touched to the source device 200 as a coordination request message using UIBC (step S608). Subsequently, the source device 200 recognizes that the incoming call button is touched at the sink device 100 based on the coordination request message and performs incoming call processing (step S610). Subsequently, the source device 200 transmits a control message instructing execution of microphone ON processing to the sink device 100 (step S612). Further, the source device 200 performs PAUSE cancel setting for reception of audio data acquired by the microphone 151 of the sink device 100 and resumes audio data reception from the sink device 100 (step S613). The sink device 100 then turns on the microphone 151 to validate audio input according to the received control message (step S614). By this means, a speech phone call between the sink device 100 and the source device 200, and the incoming call party is made (step S616).

When touch to the disconnect button is recognized at the sink device 100 (step S618), the sink device 100 transmits operation information indicating that the disconnect button is touched to the source device 200 as a coordination request message using UIBC (step S620). Subsequently, the source device 200 recognizes that the disconnect button is touched at the sink device 100 based on the coordination request message and performs disconnection processing (step S622). The source device 200 then transmits a control message instructing execution of microphone OFF processing to the sink device 100 (step S624). Further, the source device 200 performs PAUSE setting for reception of audio data acquired by the microphone 151 of the sink device 100 and suspends audio data reception from the sink device 100 (step S625). Subsequently, the sink device 100 turns off the microphone 151 to invalidate audio input according to the received control message (step S626). By this means, a speech phone call between the sink device 100 and the source device 200, and the incoming call party ends. Note that it is also possible to merge the control message instructing execution of microphone ON/OFF processing with PAUSE setting/cancel, so that when PAUSE setting is performed, the sink device 100 performs microphone OFF processing, while when PAUSE cancel is performed, the sink device 100 performs microphone ON processing.

While an example has been described with FIG. 26 where a speech phone call is disconnected by the sink device 100, there is also a case where a speech phone call is disconnected at the other party. Processing in such a case will be described with reference to FIG. 27.

Figure 27:
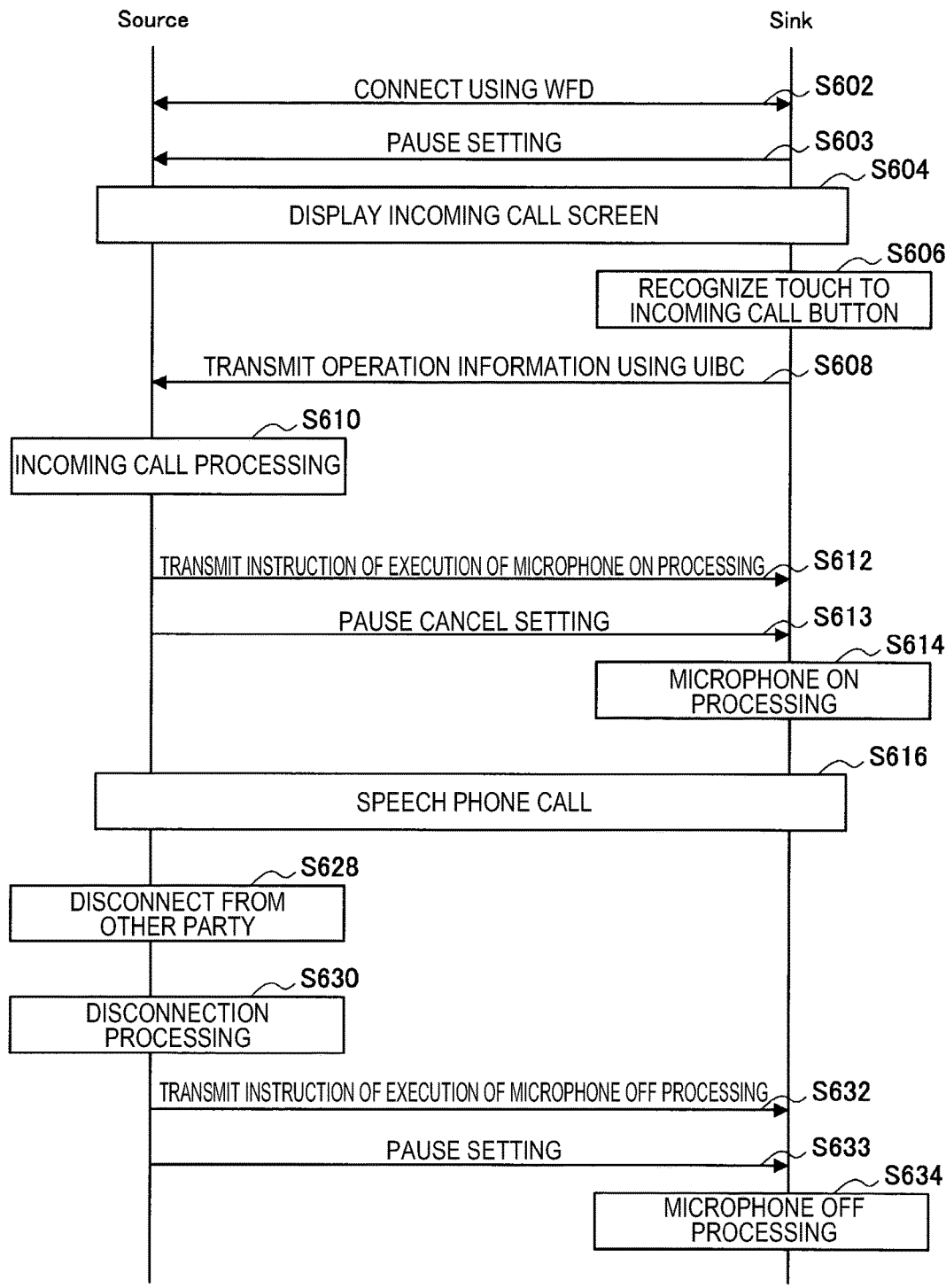
FIG. 27 is a sequence diagram illustrating an example of flow of incoming call processing executed in the communication system according to the second embodiment.

FIG. 27 is a sequence diagram illustrating an example of flow of incoming call processing executed in the communication system 1 according to the present embodiment. Because processing in step S602 to S616 in FIG. 27 is as described above with reference to FIG. 26, explanation thereof will be omitted here.

As illustrated in FIG. 27, when a speech phone call is disconnected at the other party (step S628), the source device 200 performs disconnection processing (step S630). Subsequently, the source device 200 transmits a control message instructing execution of microphone OFF processing to the sink device 100 (step S632). Further, the source device 200 performs PAUSE setting for reception of audio data acquired by the microphone 151 of the sink device 100 and suspends audio data reception from the sink device 100 (step S633). Subsequently, the sink device 100 turns off the microphone 151 to invalidate audio input according to the received control message (step S634). By this means, a speech phone call between the sink device 100 and the source device 200, and the incoming call party ends. Note that it is also possible to merge the control message instructing execution of microphone ON/OFF processing with PAUSE setting/cancel, so that when PAUSE setting is performed, the sink device 100 performs microphone OFF processing, while when PAUSE cancel is performed, the sink device 100 performs microphone ON processing.

The operation processing according to the present embodiment has been described above. According to the present embodiment, the sink device 100 can turns off the microphone 151 while the microphone 151 is not used under control of the source device 200, so that it is possible to reduce power consumption compared to a case where the microphone 151 is always turned on. Note that when the incoming call button, the call button or the disconnect button is directly manipulated at the source device 200 side, the sink device 100 can operate under control of the source device 200 in a similar manner with the message sequence described above.

6. Third Embodiment

The above-described first and second embodiments are embodiments in which the sink device 100 and the source device 200 operate in coordination with each other. The present embodiment is an embodiment in which the sink device 100 performs independent operation without coordinating with the source device 200.

Specifically, the source device 200 according to the present embodiment transmits a behavior setting message including information indicating processing for changing environment setting of the sink device 100 to the sink device 100 as command information. The environment setting can include various setting items such as, for example, a volume, brightness of a screen, time setting and power saving setting. When processing indicated in the command information is processing for changing the environment setting, the sink device 100 cancels transmission of a coordination request message in the case where operation to the command region is recognized. That is, the sink device 100 does not transmit a coordination request message although a command is executed. Therefore, in the communication system 1 according to the present embodiment, when operation for changing the environment setting is performed at the sink device 100 side, while setting change is reflected at the sink device 100 side, setting change is not reflected at the source device 200 side because operation cannot be recognized.

In a similar manner, when operation for changing the environment setting is recognized, the source device 200 does not transmit a control message for making the sink device 100 execute processing for changing the environment setting to the sink device 100. Therefore, in the communication system 1 according to the present embodiment, when operation for changing the environment setting is performed at the source device 200 side, while setting change is reflected at the source device 200 side, setting change is not reflected at the sink device 100 side because the operation cannot be recognized.

For example, when the user manipulates the in-vehicle monitor 100 to adjust a volume, the user intends to adjust a volume at the in-vehicle monitor 100 side, and does not intend to adjust a volume at the smartphone 200 side. In the present embodiment, because setting change is reflected in only an apparatus for which the user performs operation for changing environment setting among apparatuses included in the communication system 1, it is possible to realize setting change according to the user's intention.

Figure 28:
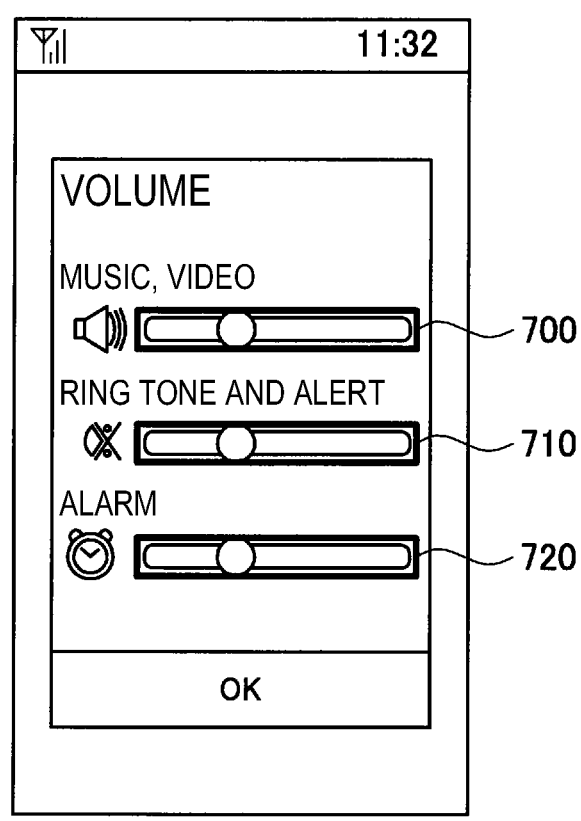
FIG. 28 is a diagram illustrating a display example of an environment setting screen according to a third embodiment.
Figure 29:
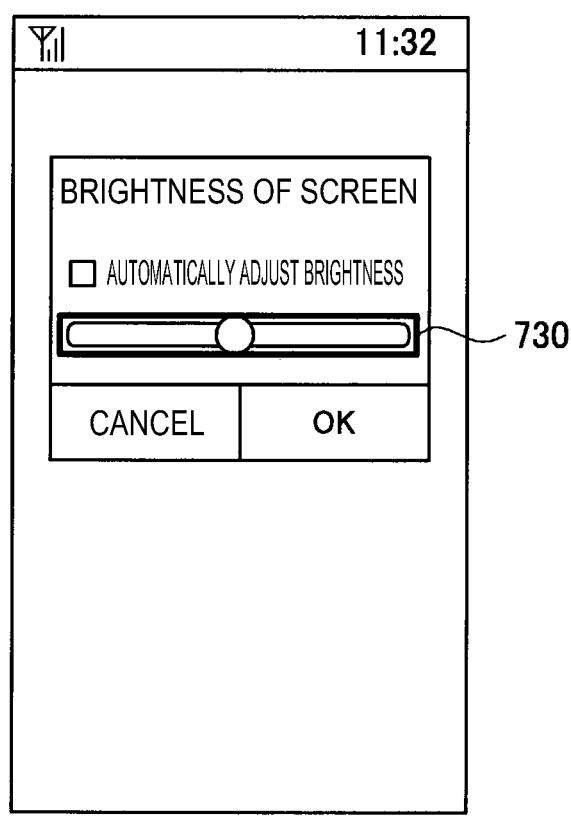
FIG. 29 is a diagram illustrating a display example of an environment setting screen according to the third embodiment.

Here, as an example, a display example of an environment setting screen and a specific example of a behavior setting message according to the present embodiment will be described with reference to FIG. 28 and FIG. 29. FIG. 28 and FIG. 29 are diagrams illustrating display examples of the environment setting screen according to the present embodiment. In the environment setting screen illustrated in FIG. 28, when volume setting regions 700, 710 and 720 are swiped, the sink device 100 or the source device 200 can adjust a volume of only the manipulated apparatus according to a direction and an amount of swipe. An example of the behavior setting message regarding the environment setting screen illustrated in FIG. 28 will be indicated below.

<Validation Message>
Coordinate information: (X1, Y1), (X2, Y2)
Type information: (swipe)
Command information: (volume)
Flag information: (valid)
<Invalidation Message>
Coordinate information: (X1, Y1), (X2, Y2)
Type information: (swipe)
Command information: (volume)
Flag information: (invalid)

Further, in the environment setting screen illustrated in FIG. 29, when a brightness setting region 730 is swiped, the sink device 100 or the source device 200 can adjust brightness of a screen of only the manipulated apparatus according to a direction and an amount of the swipe. An example of the behavior setting message regarding the environment setting screen illustrated in FIG. 29 will be indicated below.

<Validation Message>
Coordinate information: (X1, Y1), (X2, Y2)
Type information: (swipe)
Command information: (brightness)
Flag information: (valid)
<Invalidation Message>
Coordinate information: (X1, Y1), (X2, Y2)
Type information (swipe)
Command information: (brightness)
Flag information (invalid)

In the present embodiment, because setting change is reflected in only an apparatus for which the user performs operation for changing the environment setting among apparatuses included in the communication system 1, it is possible to realize setting change according to the user's intention. Note that, while in the above description, regarding operation for changing the environment setting, description has been provided in which setting change is reflected in only either the sink device 100 or the source device 200 which accepts operation, the present embodiment is not limited to this. For example, even in operation for changing the environment setting according to user setting, setting change may be reflected in both the sink device 100 and the source device 200.

7. Application Examples

The technology according to the present disclosure can be applied to various products. For example, the sink device 100 and the source device 200 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation apparatuses. Further, the sink device 100 and the source device 200 may be realized as terminals (also referred to as machine type communication (MTC) terminals) which perform machine to machine (M2M) communication, such as smart meters, vending machine, remote monitoring apparatuses and point of sale (POS) terminals. Furthermore, the sink device 100 and the source device 200 may be wireless communication modules mounted in such terminals (for example, integrated circuit modules configured in one die).

7.1. First Application Example

Figure 30:
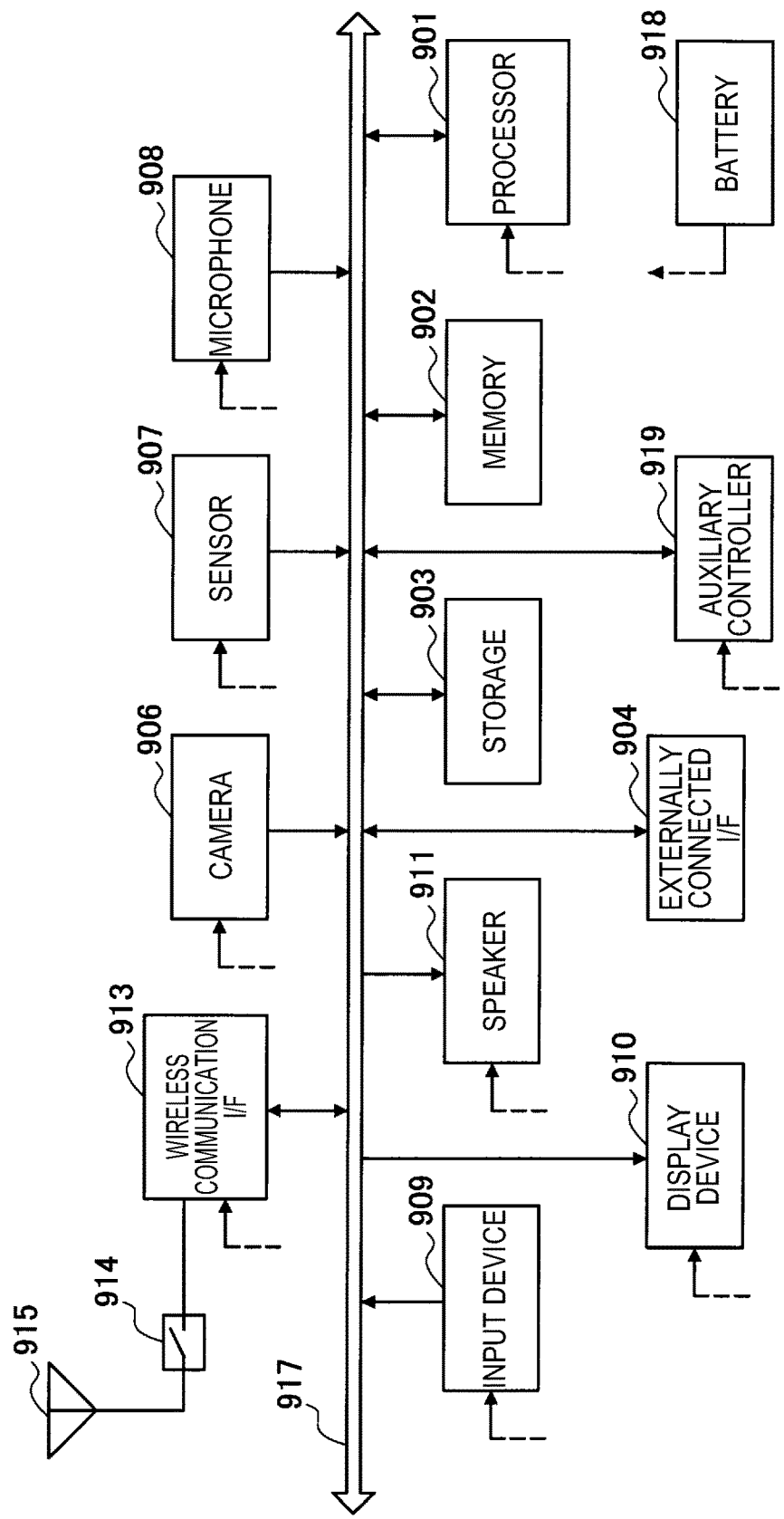
FIG. 30 is a block diagram showing an example of a schematic configuration of a smartphone.

FIG. 30 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores programs executed by the processor 901 and data. The storage 903 can include a storage medium such as a semiconductor memory or a hard disk. The externally connected interface 904 is an interface for connecting an externally attached device such as a memory card or a universal serial bus (USB) device to the smartphone 900.

The camera 906 has an image sensor, for example, a charge coupled device (CCD) or a complementary metal oxide semiconductor (CMOS) to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad to execute the wireless LAN communication. The wireless communication interface 913 can communicate with another apparatus via a wireless LAN access point in an infrastructure mode. In addition, the wireless communication interface 913 can directly communicate with another apparatus in a direct communication mode such as an ad hoc mode, Wi-Fi Direct, or the like. Wi-Fi Direct is different from the ad hoc mode, and thus one of two terminals operates as an access point. However, communication is performed directly between the terminals. The wireless communication interface 913 can typically include a baseband processor, a radio frequency (RF) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 30. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 30 via power supply lines partially indicated by dashed lines in the drawing. The auxiliary controller 919 causes, for example, required minimum functions of the smartphone 900 to be operated in a sleep mode.

The smartphone 900 illustrated in FIG. 30 can operate as a sink device. In this case, the smartphone 900 may have, for example, a function of the sink device 100 described using FIG. 2. By this means, the smartphone 900 operates based on a behavior setting message, so that the smartphone 900 can directly execute processing according to user operation without being controlled by the source device. Further, the smartphone 900 can operate as a source device. In this case, the smartphone 900 may have, for example, a function of the source device 200 described using FIG. 4. By this means, the smartphone 900 transmits a behavior setting message, so that the smartphone 900 enables independent operation by the sink device.

7.2. Second Application Example

Figure 31:
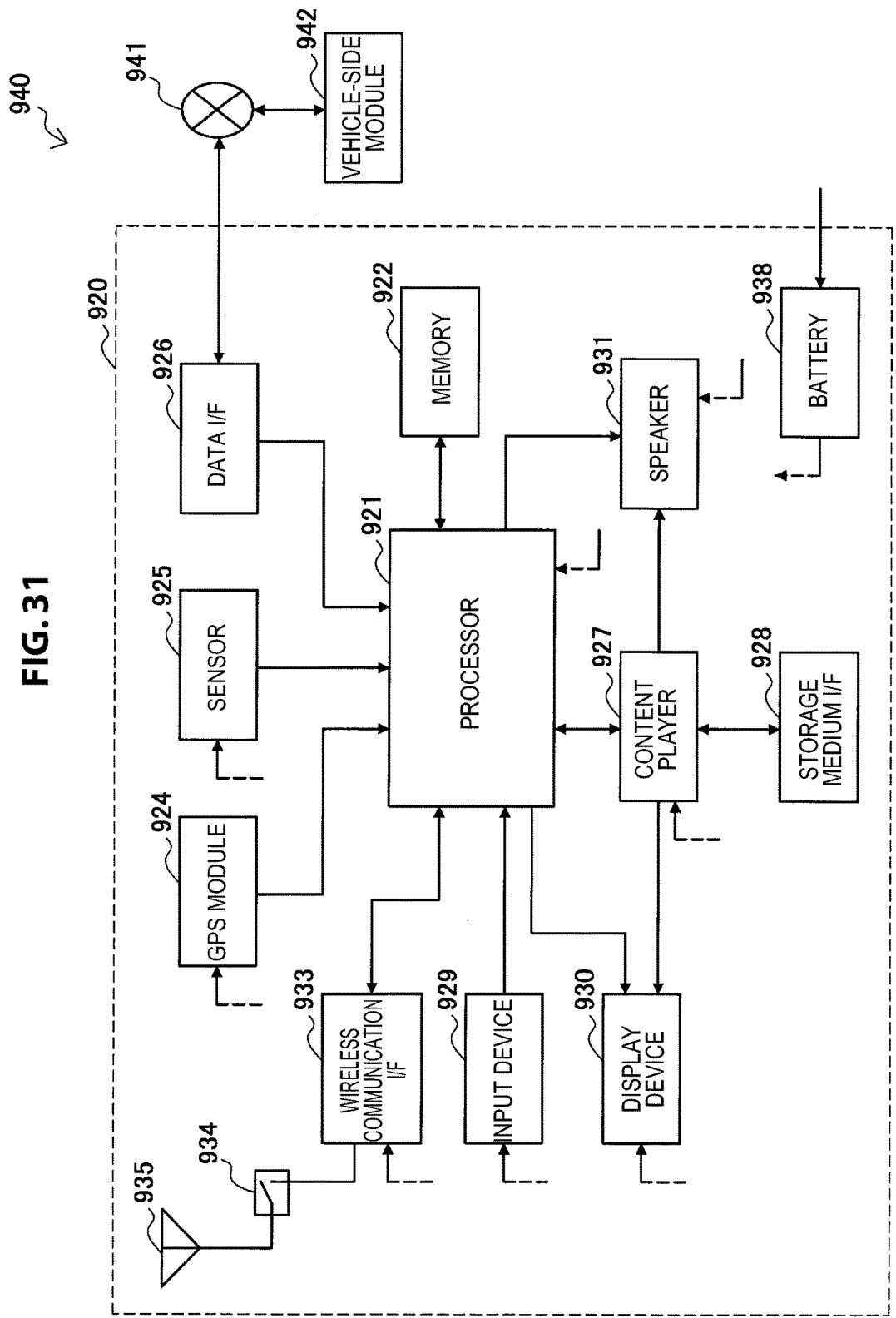
FIG. 31 is a block diagram showing an example of a schematic configuration of a car navigation device.

FIG. 31 is a block diagram showing an example of a schematic configuration of a car navigation apparatus 920 to which the technology of the present disclosure can be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation apparatus 920. The memory 922 includes a RAM and a ROM storing programs executed by the processor 921 and data.

The GPS module 924 measures a position of the car navigation apparatus 920 (for example, latitude, longitude, and altitude) using GPS signals received from a GPS satellite. The sensor 925 can include a sensor group including, for example, a gyro sensor, a geomagnetic sensor, a pneumatic sensor, and the like. The data interface 926 is connected to an in-vehicle network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad to execute wireless LAN communication. The wireless communication interface 933 can communicate with another apparatus via a wireless LAN access point in the infrastructure mode. In addition, the wireless communication interface 933 can directly communicate with another apparatus in a direct communication mode, such as an ad hoc mode, Wi-Fi Direct, or the like. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation apparatus 920 may include a plurality of antennas, without being limited to the example of FIG. 31. In this case, the antenna switch 934 may be omitted from the configuration of the car navigation apparatus 920.

The battery 938 supplies electric power to each of the blocks of the car navigation apparatus 920 shown in FIG. 31 via power supply lines partially indicated by dashed lines in the drawing. In addition, the battery 938 accumulates electric power supplied from the vehicle.

The car navigation apparatus 920 illustrated in FIG. 31 can operate as a sink device. In this case, the car navigation apparatus 920 may have, for example, a function of the sink device 100 described using FIG. 2. By this means, the car navigation apparatus 920 operates based on a behavior setting message, so that the car navigation apparatus 920 can directly execute processing according to user operation without being controlled by the source device. Further, the car navigation apparatus 920 can operate as a source device. In this case, the car navigation apparatus 920 may have, for example, a function of the source device 200 described using FIG. 4. By this means, the car navigation apparatus 920 transmits a behavior setting message, so that the car navigation apparatus 920 enables independent operation by the sink device.

The technology of the present disclosure may be realized as an in-vehicle system (or a vehicle) 940 including one or more blocks of the above-described car navigation apparatus 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

8. Conclusion

The embodiments of the technology according to the present disclosure have been described above using FIG. 1 to FIG. 31. According to the above-described embodiments, the sink device displays an image received from the source device and executes a command indicated in a behavior setting message when operation to a command region indicated in the behavior setting message in the displayed image is acquired. By this means, the sink device can directly execute processing according to user operation without the need of recognition of the user operation by the source device and an instruction to the sink device. Therefore, because the number of message exchanges between the sink device and the source device after the user operation is recognized at the sink device is reduced, response becomes higher and power consumption is reduced.

The behavior setting message can include at least one or more pieces of behavior setting information formed with combination of coordinate information indicating a command region, type information indicating a type of operation to be acquired and command information. By this means, the sink device can recognize various kinds of operation within a single screen and directly execute various kinds of commands. Further, because the behavior setting message can designate that the behavior setting information is valid or invalid, the sink device can switch recognized user operation according to screen transition.

Further, by establishing bidirectional Miracast connection in advance, the sink device and the source device can realize higher response compared to a case where bidirectional connection is established only after it becomes necessary to transmit/receive content. Further, the sink device and the source device can realize lower power consumption by performing PAUSE setting while content is not transmitted/received and by performing PAUSE cancel setting only while content is transmitted/received.

The preferred embodiments of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

The series of processes carried out by each apparatus described in the present specification may be realized by software, hardware, or a combination of software and hardware. Programs that compose such software may be stored in advance for example on a storage medium (non-transitory medium) provided inside or outside each apparatus. As one example, during execution, such programs are written into a random access memory (RAM) and executed by a processor such as a CPU.

Note that it is not necessary for the processes described in this specification with reference to the flowchart to be executed in the order shown in the flowchart. Some processing steps may be performed in parallel. Further, some of additional steps can be adopted, or some processing steps can be omitted.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing apparatus including:

a wireless communication unit configured to perform wireless communication with another information processing apparatus;

a display unit configured to display an image received from the another information processing apparatus by the wireless communication unit;

an acquisition unit configured to acquire operation to a region indicated in control information received from the another information processing apparatus by the wireless communication unit in the image displayed by the display unit; and a control unit configured to perform control to perform processing indicated in the control information according to the operation acquired by the acquisition unit.

(2)

The information processing apparatus according to (1), wherein the control information includes combination of information specifying a region for which operation is to be acquired by the acquisition unit, information indicating a type of operation to be acquired by the acquisition unit, and information indicating the processing to be controlled by the control unit when operation to the region is accepted.

(3)

The information processing apparatus according to (2), wherein the control information includes information indicating whether the combination is valid or invalid.

(4)

The information processing apparatus according to (2) or (3), wherein the control information includes a plurality of pieces of the combination.

(5)

The information processing apparatus according to any one of (1) to (4), wherein the wireless communication unit establishes bidirectional connection using Wi-Fi CERTIFIED MIRACAST (registered trademark) with the information processing apparatus.

(6)

The information processing apparatus according to any one of (1) to (5), wherein, when the control unit makes the another information processing apparatus execute processing corresponding to the processing indicated in the control information, the control unit transmits a message for executing the processing to the another information processing apparatus via the wireless communication unit.

(7)

The information processing apparatus according to (6), wherein the message includes operation information indicating the operation acquired by the acquisition unit and is transmitted using user input back channel (UIBC) on transmission control protocol/internet protocol (TCP/IP).

(8)

The information processing apparatus according to (6) or (7), wherein the message includes a message for PAUSE setting or a message for PLAY setting of real time streaming protocol (RTSP).

(9)

The information processing apparatus according to any one of (6) to (8), including:

an audio input/output unit configured to input and output sound, wherein the processing indicated in the control information is processing for validating audio input by the audio input/output unit, and wherein the processing corresponding to the processing indicated in the control information is processing regarding calling or incoming call of a speech phone call.

(10)

The information processing apparatus according to (9), wherein the processing indicated in the control information is processing for invalidating audio input by the audio input/output unit, and wherein the processing corresponding to the processing indicated in the control information is processing regarding disconnection of a speech phone call.

(11)

The information processing apparatus according to any one of (6) to (8), wherein, when the processing indicated in the control information is processing for changing environment setting of the information processing apparatus, the control unit cancels transmission of the message.

(12)

An information processing apparatus including:

a wireless communication unit configured to perform wireless communication with another information processing apparatus; and a control unit configured to transmit control information to the another information processing apparatus via the wireless communication unit, the control information being information for transmitting an image to the another information processing apparatus via the wireless communication unit and enabling the another information processing apparatus to perform corresponding processing when operation to a designated region in the displayed image is acquired.

(13)

The information processing apparatus according to (12), wherein the control unit performs control to execute processing corresponding to processing indicated in the control information based on a message received from the another information processing apparatus via the wireless communication unit.

(14)

The information processing apparatus according to (12) or (13), wherein, when the image includes a region which allows operation, the control unit transmits the control information to the another information processing apparatus via the wireless communication unit, the control information including combination of information specifying the region, information indicating a type of operation to be acquired in the region, and information indicating processing to be executed by the another information processing apparatus when operation to the region is acquired.

(15)

The information processing apparatus according to any one of (12) to (14), wherein the control information is transmitted using a message obtained by extending one of messages defined in Wi-Fi CERTIFIED Miracast (registered trademark).

(16)

An information processing system including:

a transmission side apparatus; and a reception side apparatus, wherein the transmission side apparatus includes a first wireless communication unit configured to perform wireless communication with the reception side apparatus, and a first control unit configured to transmit control information to the reception side apparatus via the first wireless communication unit, the control information being information for transmitting an image to the reception side apparatus via the first wireless communication unit and enabling the reception side apparatus to perform corresponding processing when operation to a designated region in the displayed image is detected, and wherein the reception side apparatus includes a second wireless communication unit configured to perform wireless communication with the transmission side apparatus, a display unit configured to display the image received from the transmission side apparatus by the second wireless communication unit, an acquisition unit configured to acquire operation to a region indicated in the control information received from the transmission side apparatus by the second wireless communication unit in the image displayed by the display unit, and a control unit configured to perform control to perform processing indicated in the control information according to the operation acquired by the acquisition unit.

(17)

An information processing method executed by a processor, the information processing method including:

performing wireless communication with another information processing apparatus;

displaying an image received from the another information processing apparatus;

acquiring operation to a region indicated in control information received from the another information processing apparatus in the displayed image; and controlling an information processing apparatus to perform processing indicated in the control information according to the acquired operation.

REFERENCE SIGNS LIST

1 communication system
100 sink device
110 wireless communication unit
120 stream transmission/reception unit
130 compression/decompression unit
140 display unit
150 audio input/output unit
160 control signal transmission/reception unit
170 control unit
180 user interface unit
200 source device
210 wireless communication unit
220 stream transmission/reception unit
230 compression/decompression unit
240 content acquisition unit 250 content reproduction unit
260 control signal transmission/reception unit
270 control unit
280 user interface unit
300 base station
400 external device

The invention claimed is:

1. A first information processing apparatus, comprising:
an acquisition unit;
a control unit;
a wireless communication unit configured to
receive each of an image and control information from a second information processing apparatus based on wireless communication; and
a display unit configured to display the received image,
wherein the control information includes a combination of:
first information that indicates a region in the displayed image for which an operation is to be acquired by the acquisition unit,
second information that indicates a type of the operation, for the region, as one of swipe, pinch-in, or pinch-out, and
third information that indicates a process to be controlled by the control unit, wherein
the wireless communication unit is further configured to receive a validation message from the second information processing apparatus based on the display of the received image,
the acquisition unit is configured to acquire the operation to the region in the displayed image, and
the control unit is configured to control the process indicated in the control information, based on the acquired operation and based on the reception of the validation message from the second information processing apparatus.

2. The first information processing apparatus according to claim 1, wherein the validation message indicates that the combination of the first information, the second information, and the third information is valid.

3. The first information processing apparatus according to claim 1, wherein the control information further includes a plurality of pieces of the combination of the first information, the second information, and the third information.

4. The first information processing apparatus according to claim 1, wherein the wireless communication unit is further configured to establish a bidirectional connection with the second information processing apparatus via Wi-Fi.

5. The first information processing apparatus according to claim 1,
wherein the control unit is further configured to transmit a coordination request message to the second information processing apparatus via the wireless communication unit, and
wherein the second information processing apparatus executes the process based on the coordination request message.

6. The first information processing apparatus according to claim 5,
wherein the coordination request message includes operation information,
wherein the operation information indicates the operation acquired by the acquisition unit, and
wherein the control unit is further configured to transmit the coordination request message via a user input back channel (UIBC) on a transmission control protocol/internet protocol (TCP/IP).

7. The first information processing apparatus according to claim 5, wherein the coordination request message includes one of a first message for PAUSE setting of a real time streaming protocol (RTSP) or a second message for PLAY setting of the RTSP.

8. The first information processing apparatus according to claim 5, further comprising
an audio input/output unit configured to at least one of input a first sound or output a second sound,
wherein the control unit is further configured to validate at least one of the input of the first sound or the output of the second sound, based on the control of the process, and
wherein the process indicated in the control information is associated with one of an outgoing call of a speech phone call or an incoming call of the speech phone call.

9. The first information processing apparatus according to claim 8,
wherein the control unit is further configured to invalidate at least one of the input of the first sound or the output of the second sound, based on the control of the process, and
wherein the process indicated in the control information is associated with disconnection of the speech phone call.

10. The first information processing apparatus according to claim 1, wherein the control unit is further configured to:
change an environment setting of the first information processing apparatus based on the control of the process; and
cancel transmission of a coordination request message to the second information processing apparatus based on the change of the environment setting of the first information processing apparatus.

11. A first information processing apparatus, comprising:
a wireless communication unit configured to transmit an image to a second information processing apparatus based on wireless communication; and
a control unit configured to transmit control information to the second information processing apparatus via the wireless communication unit,
wherein the control information includes a combination of:
first information that indicates a region, in the image, for which an operation is to be acquired by the second information processing apparatus,
second information that indicates a type of the operation, for the region, as one of swipe, pinch-in, or pinch-out, and
third information that indicates a process to be controlled by the second information processing apparatus,
wherein the wireless communication unit is further configured to transmit a validation message to the second information processing apparatus based on display of the image by the second information processing apparatus, and
wherein the second information processing apparatus controls the process, based on acquisition of the operation to the region in the image displayed by the second information processing apparatus and based on the validation message.

12. The first information processing apparatus according to claim 11, wherein the wireless communication unit is further configured to receive a coordination request message from the second information processing apparatus, and
wherein the control unit is further configured to execute the process associated with the control information based on the coordination request message.

13. The first information processing apparatus according to claim 11,
wherein the control unit is further configured to:
determine that the image includes the region that allows the operation, and
transmit the control information to the second information processing apparatus via the wireless communication unit based on the determination.

14. The first information processing apparatus according to claim 11, wherein the control unit is further configured to transmit the control information based on a message defined in Wi-Fi certified Miracast.

15. An information processing system, comprising:
a transmission side apparatus; and
a reception side apparatus,
wherein the transmission side apparatus includes:
a first wireless communication unit configured to transmit an image to the reception side apparatus based on wireless communication, and
a first control unit configured to transmit control information to the reception side apparatus via the first wireless communication unit,
wherein the control information includes a combination of:
first information that indicates a region, in the image, for which an operation is to be acquired by the reception side apparatus,
second information that indicates a type of the operation, for the region, as one of swipe, pinch-in, or pinch-out, and
third information that indicates a process to be controlled by the reception side apparatus, and
wherein the first wireless communication unit is further configured to transmit a validation message to the reception side apparatus based on display of the image by the reception side apparatus, and
wherein the reception side apparatus includes:
a second wireless communication unit configured to:
receive the control information; and
receive the image transmitted by the first wireless communication unit;
a display unit configured to display the received image,
wherein the second wireless communication unit is further configured to receive the validation message from the transmission side apparatus based on the display of the received image;
an acquisition unit configured to acquire the operation to the region in the displayed image, wherein the region is indicated in the control information; and
a second control unit configured to control the process indicated in the control information, based on the operation and based on the reception of the validation message from the transmission side apparatus.

16. An information processing method, comprising:
in a first information processing apparatus:
receiving each of an image and control information from a second information processing apparatus based on wireless communication;
displaying the image,
wherein the control information includes a combination of:
first information that indicates a region in the displayed image for which an operation is to be acquired by the first information processing apparatus,
second information that indicates a type of the operation, for the region, as one of swipe, pinch-in, or pinch-out, and
third information that indicates a process to be controlled by the first information processing apparatus;
receiving a validation message from the second information processing apparatus based on the display of the image;
acquiring the operation to the region in the displayed image; and
controlling the process indicated in the control information, based on the acquired operation and based on the reception of the validation message from the second information processing apparatus.

* * * * *